(12) United States Patent
Shintani et al.

(10) Patent No.: US 7,680,025 B2
(45) Date of Patent: Mar. 16, 2010

(54) OPTICAL INFORMATION RECORDING MEDIUM, REPRODUCING METHOD THEREOF, AND MANUFACTURING METHOD THEREOF

(75) Inventors: Toshimichi Shintani, Kodaira (JP); Harukazu Miyamoto, Higashimurayama (JP); Yumiko Anzai, Ome (JP); Hiromi Kudo, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 1174 days.

(21) Appl. No.: 11/051,143

(22) Filed: Feb. 7, 2005

(65) Prior Publication Data

US 2006/0072434 A1     Apr. 6, 2006

(30) Foreign Application Priority Data

Oct. 4, 2004     (JP) .............................. 2004-290891

(51) Int. Cl.
 *G11B 7/24* (2006.01)
(52) U.S. Cl. .................................. 369/275.5
(58) Field of Classification Search ........... None
 See application file for complete search history.

(56) References Cited

U.S. PATENT DOCUMENTS 6,087,067 A * 7/2000 Kato et al. ............. 430/270.13

7,390,546 B2 * 6/2008 Yasuda ....................... 428/64.1

FOREIGN PATENT DOCUMENTS

| JP | 05-282674 | 10/1993 |
| JP | 07-244870 | 9/1995 |
| JP | 2003-168244 | 6/2003 |

OTHER PUBLICATIONS

High-Density Near-Field Readout over 50 GB Capacity Using Solid Immersion Lens with High Refractive Index Jpn. J. Appl. Phys. vol. 42 (2003) pp. 1101-1104.
Premastered Optical Disk by Superresolution Jpn. J. Appl. Phys. vol. 32 (1993) pp. 5210-5213.
Rewritable Dual-Layer Phase-Change Optical Disk Jpn. J. Appl. Phys. vol. 38 (1999) pp. 1679-1686.
Inorganic Write-once Disc with Quadruple Recording Layers for Blu-ray Disc System Optical Data Storage 2003, Michael O'Neill, SPIE vol. 5069 pp. 90-97.

* cited by examiner

*Primary Examiner*—Joseph H Feild
*Assistant Examiner*—Parul Gupta
(74) *Attorney, Agent, or Firm*—Antonelli, Terry, Stout & Kraus, LLP.

(57) ABSTRACT

Super-resolution technology was proposed for generating marks smaller than the optical resolution in order to record data at high density on the optical disk. However, the achievable high density of the super-resolution technology was limited due to fluctuation of the region exhibiting the super-resolution effect due to the grain size or the molecular size comprising the super-resolution film. However fluctuation in the region exhibiting the super-resolution effect is reduced by utilizing recording marks possessing their own super-resolution effect and also by separating the recording marks from each other.

11 Claims, 16 Drawing Sheets

FIG.5

| LAYER No. | FILM THICKNESS | | | REFLECTIVITY | | | TRANSMITTING | | | REFLECTIVITY AT DRIVE |
|---|---|---|---|---|---|---|---|---|---|---|
| | FILM 1 | FILM 2 | FILM 3 | FILM 4 | SPACE | PIT | MELTING REGION | SPACE | PIT | AVERAGE | |
| 1 | 25nm | 4nm | 20nm | 5nm | 2.4% | 2.4% | 8.6% | 95.3% | 75.3% | 88.6% | 6.2% |
| 2 | 25nm | 4nm | 20nm | 5nm | 2.4% | 2.4% | 8.6% | 95.3% | 75.3% | 88.6% | 5.5% |
| 3 | 25nm | 4nm | 20nm | 5nm | 2.4% | 2.4% | 8.6% | 95.3% | 75.3% | 88.6% | 4.9% |
| 4 | 25nm | 4nm | 20nm | 5nm | 2.4% | 2.4% | 8.6% | 95.3% | 75.3% | 88.6% | 4.3% |
| 5 | 50nm | 4nm | 20nm | 5nm | 3.2% | 3.5% | 10.6% | 94.5% | 74.4% | 87.8% | 4.6% |
| 6 | 10nm | 6nm | 25nm | 5nm | 5.5% | 5.8% | 15.8% | 92.3% | 68.2% | 84.3% | 5.6% |
| 7 | 45nm | 8nm | 25nm | 10nm | 6.3% | 6.6% | 19.2% | 89.3% | 53.9% | 77.5% | 5.9% |
| 8 | 5nm | 10nm | 40nm | 10nm | 20% | 20% | 34.2% | 76.2% | 54.6% | 69.0% | 5.0% |

| LAYER No. | READOUT POWER | ERROR RATE |
|---|---|---|
| 1 | 1.5mW | $3.2 \times 10^{-7}$ |
| 2 | 1.9mW | $5.5 \times 10^{-7}$ |
| 3 | 2.4mW | $8.6 \times 10^{-7}$ |
| 4 | 3.1mW | $9.3 \times 10^{-7}$ |
| 5 | 3.9mW | $9.1 \times 10^{-7}$ |
| 6 | 5.1mW | $8.8 \times 10^{-7}$ |
| 7 | 7.2mW | $6.9 \times 10^{-7}$ |
| 8 | 12.0mW | $7.8 \times 10^{-7}$ |

OPTICAL INFORMATION RECORDING MEDIUM, REPRODUCING METHOD THEREOF, AND MANUFACTURING METHOD THEREOF

CLAIM OF PRIORITY

The present invention claims priority from Japanese application JP 2004-290891, filed on Oct. 4, 2004, the content of which is hereby incorporated by reference into this application.

FIELD OF THE INVENTION

The present invention relates to technology for high density optical disks.

BACKGROUND OF THE INVENTION

Currently, research and development efforts are making advances in technology for achieving high density optical recording that is capable of storing large quantities of information per unit of surface area. In products currently utilizing optical disk technology, a laser light is irradiated through a lens onto a disk, and the data recorded on the disk is then reproduced and/or recorded. Up until now, in order to record data at high densities, technology has been developed for reducing the size of the focused laser beam spot. The spot size was proportional to $\lambda/NA$, where the wavelength of the light source is $\lambda$ and NA is the numerical aperture of the objective lens. In other words, much progress was made in storing larger quantities of information on one disk by enlarging the numerical aperture of the objective lens and shortening the light source wavelength. Here, the combination of the light wavelength, the NA of the objective lens, and the capacity for writing data stored on a medium that is 12 centimeters in diameter is 780 nm, 0.5, 650 MB, respectively, for a CD; and it is 650 nm, 0.6, 4.7 GB, respectively, for a DVD. Disclosed technology utilizing a blue laser source allows two combinations comprised of 405 nm, 0.85, 25 GB; and 405 nm, 0.65, 20 GB. This recording capacity is sufficient for recording approximately two hours of high definition television image data.

However, this recording capacity is insufficient for applications in security systems and business systems, such as broadcast stations. Such applications typically require a recording capacity, for example, of 100 GB or more per disk. Preferably, it should be possible to record as great a quantity of information as possible on one disk in view of the existence of locations which store large quantities of data on storage mediums, such as for image data requiring a long term storage ranging from a few dozen to a hundred years. The capacity required for such tasks ranges from several hundred GB to 1 terabyte (TB) or more.

However, increasing the disk storage capacity by utilizing the above-described methods is practically impossible. First of all, development of a semiconductor laser for a short wavelength light source is extremely difficult. Secondly, even if such a semiconductor laser were developed, the light source is ultraviolet light, which is absorbed by the disk substrate and protective film, and so obtaining a satisfactory write/read quality is predicted to be impossible. Research into enlarging the NA of the objective lens is progressing, and technology relating thereto was reported, for example, in the Japanese Journal of Applied Physics Vol. 42, pp. 1101-1104 (2003) involving the setting of the NA to 1.8. However since the light used for a write/read operation in this system is not the normal propagating light, but is a light within the lens referred to as near-field light, the lens must be brought extremely close to the disk surface, and that distance must be maintained between the lens and disk, so that a mechanism to move the lens over the disk is necessary. This type of system closely resembles the hard disk used in magnetic recording, and disk removability, which is one advantage of optical disks, is difficult in this system.

To resolve these difficulties, super-resolution technology was proposed for effectively improving the light resolution by installing some type of mechanism on the disk. Super-resolution technology utilizing a phase-change recording film as the medium was reported, for example, in the Japanese Journal of Applied Physics Vol. 32 pp. 5210-5213. Phase-change film is usually utilized as a recording film for rewritable disks, such as CD-RW, DVD-RAM, DVD±RW and Blu-ray discs, etc. However, this recording material is not used as a recording film, but rather, it is used as a layer to effectively boost the optical resolution, in the same manner as the readout layer on a magneto-optical (MO) disk. This type of layer is called a super-resolution layer. In this method, a phase-change recording film is formed by sputtering onto a read-only (ROM) disk, to melt a portion of the phase-change recording film during read-out. If the melted portion has a sufficiently higher disk reflectivity, then the signal obtained from the melted portion will be predominant among the readout signals. In other words, the melted portion of the phase-change film essentially becomes the readout light spot. The surface area of the melted portion is smaller than the light spot, so that the readout light spot size is reduced to improve the optical resolution.

In the method disclosed in patent document 1, a phase-change film is utilized as the super-resolution layer, and the film thickness of that phase-change film is modulated according to the recording pattern to establish a thin and a thick phase change film. In the disk fabrication for this method, first of all, a mask containing a recording mark pattern is formed by optical lithography. The film thickness of the phase-change film is then modulated, for example, by patterning by reactive ion etching by way of the mask during or after sputtering via the mask to form the phase-change film. By regulating the readout light power during readout of a disk fabricated in this way, only the thin section of the phase-change film melts without the thick section melting. In this way, a super-resolution effect can be obtained in the same way as the above-described method that uses a phase-change film as a super-resolution film.

Another type of super-resolution technology that is disclosed in patent document 2 attempts to improve the recording characteristics by recording signals on concave capsules. In this patent document 2, an array of concave pits of equal length are fabricated on the substrate, and a phase-change film, a protective film and a reflective film are formed on that substrate, and the crystalline-amorphous shape of the phase-change recording film of the pit is controlled by the same method as used in normal phase-change recording. These concave pits constitute the recording units. On an ordinary rewriteable phase-change medium, film thickness irregularities occur when rewriting data many times in the same location on the disk, and these irregularities cause the write/read characteristics to deteriorate. One reason for this deterioration is that the melting of the recording film, due to the scanning of the light spot during data rewriting, induces a temperature gradient in the melted section that causes a material flow in the recording film. In the method disclosed in patent document 2, however, the location melted on the recording film is within the concave pit, so that material flow of the recording film is inhibited and a larger number of data overwrites is possible. Besides super-resolution technology, multi-layer optical disk technology has also been disclosed for achieving optical disks with a large information capacity. In this technology, one optical disk contains multiple recording surfaces, and the recorded data is separately recorded and/or reproduced on these recording surfaces. This multi-layer optical disk technology, for example, has been reported in the Japanese Journal of Applied Physics Vol. 38 pp. 1679-1686. To record and reproduce using this method, first of all a light is irradiated from the substrate side of the disk in the same manner as with a conventional optical disk, and a light spot is focused on the recording surface for recording and reproducing. The quantity of reflected light is detected during readout. In other words, the light must transmit through the layer on the nearest side during recording/reproducing on the innermost layer, as seen from the substrate side. The structure of the conventional optical disk is designed to take reflectivity into account. However, in a multilayer optical disk, the transmittance must be maintained at a certain level or higher in all except the innermost layer. In other words, the structure of the multilayer optical disk must meet demands for both transmittance and reflectivity in each layer. Moreover, each layer must be separated by at least a certain distance from other layers to prevent effects from marks recorded on other layers during readout of a layer. This method is reported in the Proceedings of the SPIE, Vol. 5069, pp. 90-97, disclosing an example attaining a four-layer write-once optical disc (CD-R/DVD-R). The transmittance of each layer from the substrate side, as provided in that report, was, respectively, 81.6%, 74.4%, 63.3% and 0%. The amount of reflectivity obtained during readout from a disk drive was five percent or more for all layers.

[Patent document 1] JP-A No. 244870/1995

[Patent document 2] JP-A No. 282674/1993

[Non-patent document 1] Japanese Journal of Applied Physics Vol. 42 pp. 1101-1104 (2003)

[Non-patent document 2] Japanese Journal of Applied Physics Vol. 32 pp. 5210-5213

[Non-patent document 3] Japanese Journal of Applied 15 Physics Vol. 38 pp. 1679-1686

[Non-patent document 4] Proceedings of SPIE Vol. 5069, pp. 90-97

The above-described methods achieve a super-resolution effect mainly by using heat to form a region using the varied optical properties in the light spot. These methods effectively improve the optical resolution. These methods are also capable of obtaining a mark readout signal at a size where normal readout methods cannot obtain a sufficient signal. Moreover, these methods boost the recording capacity of the optical disk, or in other words, are capable of recording the data at a higher density.

However, the heat distribution within the light spot contains jitter. The reason for this jitter is the presence of crystalline particles caused by the fact that at least a number of films forming the disk are poly-crystal and/or that thermal diffusion uniformity is lost due to defects in the film. Due to these factors, jitter is present in the shape and size of the effective readout light spot formed by the super-resolution effect. This jitter is the cause of readout errors and noise that are not present when using normal readout methods. This type of noise is referred to here as super-resolution noise.

Except for the organic film, all of the super-resolution film is poly-crystal. The particle sizes of these films differ according to their materials, but they are generally several tens of nm or more. The molecular size of an organic film is also determined in those units and is approximately 10 nm. In other words, the effective spot size in super-resolution contains a jitter of several dozens of nm.

Spot size jitter in conventional disk drives occurs due to errors in the auto-focusing servo, etc. In conventional disk drives, the spot size jitter due to auto-focusing errors is set within approximately five percent. Therefore, in super-resolution, a five percent jitter is also allowed in the effective spot size. Moreover, assuming a heat jitter of about 20 nm due, for example, to crystalline particles, the required effective spot size is 400 nm or more. The Blu-ray disc currently available in product form possesses a light source wavelength of 405 nm, and the NA for the objective lens is 0.85, so that the $\lambda$/NA is approximately 480 nm. The Blu-ray disc recording capacity is about 23.3 gigabytes, so that the recording capacity achieved by super-resolution is $(480/400)^2$ times that amount, approximately 33.5 gigabytes. This figure is the limit that the recording density can be improved in a medium by super-resolution technology. Therefore, achieving a several hundred GB to 1 TB recording capacity, as was described in the "Background of the Invention", is impossible with conventional techniques.

There is an upper limit on the number of layers of recording surfaces in multi-layered optical disks, because the design must take the transmittance and the reflectivity of each layer into account, as described in the "Background of the Invention". The reason for this is that, when one considers those layers that are mostly on the substrate side, for example, a high transmittance must be maintained because of the many layers. However, when the transmittance is set high, the reflectivity becomes low, and there is a decrease in the signal amplitude for that layer. Conversely, when the reflectivity is set high in order to improve the signal level for that layer, little light reaches the inner layer, so that there is a decrease in the signal amplitude of that inner layer.

In the method described in patent document 1, the film thickness of the phase-change film is modulated, however the recording film is continuous, so that there is a large possibility that a portion of the space section will melt during the melting of the mark section due to heat flowing to the space section. The melted surface area of this space section depends on the recording film particle size, defects within the recording film, and jitter in the transition section changing with the film thickness, causing the same potential problems described above that limit the super-solution effect.

In the method of patent document 1, the film thickness of the phase-change film is formed by sputtering using a mask or is formed by RIE (reactive ion etching) using a mask. In these methods, such as sputtering or RIE that utilize plasma, the plasma leaks from the rear side of the mask, so that the film thickness transition section becomes smoother. The width of this transition section depends on the process conditions, but is generally about 100 nm. The transition section is in front of and behind the mark, so using the method of patent document 1 is impossible when the mark length is 200 nm or less. In other words, it is difficult to utilize this method to attain a recording capacity equivalent to or greater than the capacity of the Blu-ray disc.

The method of patent document 2 can improve the overwrite cycle (the number of times rewrite can be performed) by suppressing the material flow during recording. However, when using this method during readout, the recording density is determined by the light spot size, as determined by the light source wavelength, and the NA of the objective lens. The method of patent document 2, therefore, renders no effect in improving the recording density or the recording capacity.

SUMMARY OF THE INVENTION

In order to resolve the above-described problems, each of the recording marks is separated, and data is read out utilizing the super-resolution effect by melting those recording marks. A conceptual view showing the state when the disk is irradiated by light is shown in FIGS. 1A and 1B. FIG. 1A is a cross sectional view and FIG. 1B is a top view. The pits 102 which correspond to recording marks are formed in a state in which they are completely isolated from each other by a thermal insulator 103. The thermal insulator 103 is a heat blocking film made from a material having a thermal conductivity lower than that of the pits. A protective film 104 is formed on the thermal insulator 103. Since the pit is a recording mark, the pit length is modulated according to the recording data.

The laser light 105 is irradiated by way of an objective lens 106 onto the disk in order to read out the data recorded on the disk with the drive. A focus spot 108 is formed in this way on the disk. The irradiation power is set to a level sufficient to melt the pit only in the section of strong light intensity in the vicinity of the center of the light spot. The light spot 108 is sufficiently large compared to the pit 102 serving as the recording mark, and there are many pits 102 within the light spot 108. When using the normal readout method, information on multiple pits will overlap in the readout signal. These pits cannot be separated and reading out their data is impossible. However, by melting only one pit, that pit will impart a readout signal whose intensity is different from the other pits, and, therefore, the information can be extracted for just that melted pit. Limiting the melted area to one pit is essential, and, therefore, the pits are preferably isolated from each other by a thermal insulator 103 made from a material having a lower thermal conductivity than the pits. Materials with a low thermal conductivity include, for example, $SiO_2$ in an amorphous state, and $ZnS$—$SiO_2$ or $SnO_2$ used, which are used as the protective films for optical disks.

Though the above-mentioned technique is one type of super-resolution, this invention is characterized in that the marks are completely separated. Separating the marks completely will suppress all super-resolution noise and allows recording data at a high density. A conceptual view is shown in FIGS. 2A and 2B. Assume that the profile 201 of the Gaussian beam irradiation light is assumed to have the profile 202, if the input light power is set high. In this case, the effective spot size 204 enlarges to the size 205 from the temperature threshold 203 exhibiting the super-resolution effect. This jitter must be suppressed, for example, to about five percent of the effective spot size. In other words, if the effective spot size 204 is 100 nm, then the jitter in the effective spot size must be 5 nm or less. In contrast, in accordance with the present invention as shown in FIG. 2B, the section where the temperature within the Gaussian beam is at or higher than the pit melting point 206 exhibits the super-resolution effect. However, since the pits that function as the super-resolution film are separated, the maximum allowed jitter may be equal to the minimum pit length or less. In other words, a jitter of about 25 nm is allowed when the minimum pit length is 50 nm. Even if the temperature distribution fluctuates in that range, there is no change in the number of melted pits, so that there is virtually no change in the amplitude of the readout signal. Moreover, utilizing non-continuous pits ensures that no readout errors will occur, for example, due to defects in the super-resolution film, etc. Even if there was, for example, a defect within the pit, the pit is melted so that the movement of the atoms eliminates that defect.

The present invention further reduces noise from the readout signal obtained by conventional super-resolution technology, and so it provides the effect of improving the S/N (signal-to-noise) ratio. The reason for the improved S/N ratio is that, in conventional super-resolution technology, a super-resolution film covers the entire surface of the disk, and that film is the source of the noise. In accordance with the present invention, the only cause of noise is the pits, if all of the film, except for the pits, is a transparent dielectric film. And, moreover, these pits exist on only a portion of the disk. Here, an estimate is made as to what extent the noise is reduced.

Causes of noise are grouped into system noise, laser noise, and medium noise. Medium noise is further sub-grouped into film noise and mark noise. Those noises, other than system noise, depend on the disk reflectivity; however, to simplify the comparison, this disk and the disk of the present invention are assumed to have equivalent reflectivity. The surface area that the pits occupy on the disk is assumed to be one-fourth of the disk data region. The proportion of marks and spaces is usually equal along the direction of the tracks; however, the mark width is one-half the track width. The marks are therefore one-half the width along the track direction, and half the width along the disk radius, and, therefore, they occupy about one-fourth of the disk. In other words, the amount of light reflectivity from the noise source (film) is about one-fourth, so that the film noise is reduced by about 12 dB. The other noise is largely the same as that produced by the conventional technology. The noise content during readout of the conventional phase-change disk and the disk of the present invention are shown in Table 1. This table clearly shows that the signal noise of the present invention is reduced by 1.3 dB.

TABLE 1

|  | Conventional disk | Disk of the present invention |
|---|---|---|
| System noise | −43.7 dB | |
| Laser noise | −47.4 dB | |
| Film noise | −44.3 dB | −56.3 dB |
| Mark noise | −43.7 dB | |
| Total | −38.5 dB | −39.8 dB |

The extent of the advantage rendered by this 1.3 dB noise reduction depends on the SN ratio, the inter-symbol interference and the signal readout method. However, the extent of the advantage will be estimated based on an actual optical disk. Firstly, the error rate during data readout caused only by the SN ratio will be estimated. The SN ratio of the conventional disk, first of all, is assumed to be 18 dB, which is the same as a conventional optical disk. The SN ratio of the disk of the present invention is 19.3 dB. It is assumed that the equalizer used to amplify the signal amplitude from the shortest mark length is the same as the one used for CD and DVD. With this assumption, the readout signal jitter of the conventional disk and disk of the present invention are respectively 5.7 percent and 4.88 percent so that the data error rates are $1.11 \times 10^{-18}$ and $1.22 \times 10^{-24}$, respectively. An error due to inter-symbol interference and servo error, in fact, is added to these data error rates, however the error rate provided by the present invention due to the SN ratio can be seen to be reduced by six digits. Both of the above-mentioned error rates are sufficiently low. However, in computer applications where absolutely no errors can be allowed, this six digit reduction in the error rate produces an extremely large effect.

The material comprising the pits in the disc of the present invention preferably is a phase-change recording material, such as GeSbTe or AgInSbTe. There are mainly three reasons for using this material, and those reasons will be described next.

The first reason is that using this material makes the forming of the pits easier. Forming the pits is easier because the alkaline solution dissolves the phase-change material differently in amorphous and crystalline states (Applied Physics Letters Vol. 85, pp. 639-641).

A second reason is that phase-change recording is ideal for forming microscopic patterns. When forming an amorphous mark in the crystallized portion by melting a localized section of crystal by irradiation with a laser beam and then providing sudden cooling, the periphery of the melted section is crystallized due to the slow cooling. This process is called recrystallizing. This recrystallization forms marks smaller in size than the melted area so that a mark smaller than the size of the recording light spot can be recorded at a high power margin. Forming a mark, for example, of 50 nm with good reproducibility is impossible with current optical lithography techniques; however, forming such marks is possible by phase-change recording. Examples demonstrating this type of recording by simulation and experiment are disclosed in Applied Physics Letters Vol. 85, pp. 639-641.

A third reason is that the melting point of the phase-change recording film is at an appropriate temperature of about 550 to 650° C. When the melting point is too low, the readout light power will vary due to factors, such as the drive internal temperature, and this will cause errors. The drive internal temperature in particular may vary from 10 to 80° C., and it may cause heat jitter if the pit melting point is around 100° C. A melting point around 600° C., however, is within the adjustable range of the drive internal temperature. Conversely, if the melting point is too high, then a high readout light power is required, which causes high drive power consumption and leads to poor semiconductor laser performance. Therefore, the melting point of the phase-change recording film is an appropriate temperature.

The structure of the film for the disk will be evaluated next. Factors such as the readout signal, recording characteristics and disk fabrication method must be considered when designing the film structure. Here a design for obtaining a satisfactory readout signal will be described.

The following description assumes a readout of data from a conventional optical disk drive. In this case, the reflectivity of the disk must be considered. A disk structure such as shown in FIG. 3A is assumed for this example. Here, $SiO_2$ material with low thermal conductivity was utilized as the thermal insulator 103 in FIG. 1.

The structure in FIG. 3A contains an $SiO_2$ section 303, S a steady state pit section 304, and a melted pit section 305 in the recording film layer, so that the reflectivity of these three sections must be considered. The respective reflectivity values are here written as $R_{space}$, $R_{pit}$, $R_{melt}$. Here, two important points for boosting the readout signal are (1) increasing the differential between $R_{space}$ and $R_{melt}$ and (2) lowering the differential between $R_{space}$ and $R_{pit}$. In (2) above, the section where the pit is melted only contributes to the readout signal: when the condition $R_{space}=R_{pit}$ is strictly satisfied, and the recording mark does not contribute to modulating the reflected light unless the pit is melted. Conversely, the absolute value $|R_{space}-R_{pit}|$ of the $R_{space}$ and $R_{pit}$ differential appears as noise during readout. The evaluation coefficient F for the readout signal is defined as indicated by Eq. 1.

$$F = \left| \frac{R_{space} - R_{melt}}{R_{space} - R_{pit}} \right| \quad \text{(Eq. 1)}$$

The disk structure is designed with the goal of increasing this evaluation coefficient F.

FIG. 3B shows the results from calculating the relation of F with $d_{rec}$ and $R_{space}$, $R_{pit}$, $R_{melt}$ when the recording film layers 303, 304, 305 are all the same film thickness $d_{rec}$. The light source wavelength is here assumed to be 400 nm with a blue-violet laser. Moreover, the material in the pit structure is GeSbTe, which is a typical phase-change recording film material. The film thickness of films 302, 306, 307, calculated as shown in FIG. 3B, are respectively 55 nm, 30 nm, and 20 nm. The F value is large at this combination; however, other structures are also capable of securing a large F value. These other combinations will be described later. In FIG. 3B, $R_{space}$ and $R_{pit}$ are nearly equal in the vicinity of 20 nm for $d_{rec}$. Further, the $|R_{space}-R_{melt}|$ of the numerator of F is approximately 15%. The difference in reflectivity between the mark section and the space section is about 15 to 25% on a normal phase-change optical disk, so that one can see that an equivalent difference in reflectivity is obtained. In other words, virtually all super-resolution noise is suppressed in the above-described structure. Moreover, a large signal can be obtained, so that the SN ratio is boosted compared to the conventional super-resolution technology.

The recording capacity achieved by the present invention will be estimated next. FIG. 4 shows results obtained from calculating the mark length dependence of the signal amplitude obtained by the present invention. The vertical axis indicates the normalized amplitude obtained by an infinitely long mark. The track width is assumed to be 0.24 μm and the mark width is half of the track width. Generally, the shape of the phase-change mark becomes a circular mark or a wide chevron mark according to the type of recording film and recording method. This is reported, for example, in the Japanese Journal of Applied Physics Vol. 41, pp. 631-635, along with the mechanism of recording. Calculation results for a rectangular mark, resembling the chevron mark, and a circular mark are shown in FIG. 4. Results from calculating the amplitude obtained in the shortest mark array of the Blu-ray disc with a 25 GB capacity are indicated here for comparison.

Assuming the lower limit amplitude value obtained here is the same as the Blu-ray disc minimum amplitude, examining FIG. 4 shows that the shortest mark length obtained by the present invention is 0.06 μm for the circular mark, and 20 nm for a chevron mark. The shortest mark length for the 25 GB Blu-ray disc is 0.149 μm and the track pitch is 0.32 μm, and so, assuming that recording capacity attained by the present invention is equivalent to Blu-ray disc conditions, such as disk size and format efficiency, then the recording capacity of the present invention is approximately 83 GB in the case of the circular mark and 248 GB in the case of the chevron mark.

The technology of the present invention includes advantages when applied to multi-layer optical disks. In order to obtain both reflectivity and transmittance when designing a multilayer optical disk structure, the transmittance is usually set at approximately 50%. This setting allows a four layer disk structure. Optical disks usually contain recording film over the entire recording surface; however, the structure in FIG. 3A is likely to deliver a high transmittance, since the recording pits are only present in sections, and the space sections are only made from thin silver film.

The number of layers attained by the present invention can also be estimated. Here, the multilayer disk contains n number of layers. Each layer is respectively referred to from the light incident side as the 1st layer, 2nd layer, . . . i-th layer, . . . n-th layer, etc. If the transmittance and the reflectivity of each layer are set as $T_i$ and $R_i$ and the reflectivity obtained when reading out the i-th layer in the drive is set as $R_i^{drive}$ then the following Eq. 2 applies.

$$R_i^{drive} = Ri \cdot \prod_{j=1}^{i-1} T_j^2 \qquad \text{(Eq. 2)}$$

Here, $T_j$ is squared because the light must transit the same layer two times when detecting the amount of reflectivity to read out the data. When estimating the number of layers, $R_i^{drive} > 4\%$ for all layers is assumed, the same as the design indicator in the literature for the above-mentioned four layer optical disk. The condition $|R_{space} - R_{pit}| < 0.5\%$ was also added. The transmittance, the reflectivity for each layer, and the design values of the film thicknesses obtained for these conditions are shown in FIG. 5. The disk structure is assumed to be the structure shown in FIG. 3A. The numbers for the film in FIG. 3A are denoted in sequence in FIG. 5 from the substrate 301 side, as layer 1 for film 302, the films 303, 304, 305 are all collectively denoted as layer 2, the film 306 is denoted as layer 3, and the film 307 is denoted as layer 4.

The results obtained from FIG. 5 reveal that an eight-layer optical disk can be attained. The reflectivity differentials for the spaces and melted pits obtained in the drive for the results in FIG. 5 are 4.3% to 6.2%, respectively, for all layers. The results also show that a signal amplitude is obtained that is equivalent to or greater than the results reported for the above-mentioned four layer disk. If one layer possesses a recording capacity of 83 GB, then, with eight layers, a recording capacity of approximately 660 GB can be achieved. If utilizing the chevron mark, one layer is 248 GB, so, with eight layers, a capacity of approximately 2 TB can be achieved. Moreover, using the multilayer disk in conjunction with the present invention serves to alleviate the effects of layer cross-talk. In the normal multilayer optical disk, the light also irradiates through layers other than the layer to be recorded or reproduced. A portion of the light reflected from those layers penetrates into the drive photodetector, and so, effects from layers other than the layer to be recorded or reproduced cannot be completely prevented. This effect is called layer cross-talk. The extent of the layer cross-talk depends on optical conditions and the disk specifications, however, in order to reduce layer cross-talk, it is essential to make the inter-layer spacing as large as possible. However, increasing the inter-layer spacing causes problems. For example, when reading/writing on the innermost layer, the substrate thickness appears, as viewed in terms of optical conditions, in a state equivalent to a deviation from the optimum value, and this causes spherical aberrations to occur. This effect is reported, for example, in the Japanese Journal of Applied Physics Vol. 42, pp. 5624-5633.

In accordance with the present invention, however, the effect of recorded marks on layers out of the focus point of the light spot is small enough to be ignored, because the marks are detected by a disk structure designed to reduce the value of $|R_{space} - R_{pit}|$, and because the recording marks are melted only when the light spot in the focus point and the power density has increased. Therefore, there is no need to increase the inter-layer spacing. It is essential that a layer be separated to more than the focus point depth of the light spot, and that thermal conduction be suppressed to a level that does not melt pits in a layer out of the focus points. The focal depth of the spot is approximately 300 nm as a condition, for example, for the Blu-ray disc. Moreover, the thermal conduction can be controlled by means of the minimum distance between pits so that, if the distance between pits for example, is 100 nm, then the data can be read out without melting the neighboring pits. An interlayer spacing of 500 nm or more is therefore sufficient, and eight layers can be formed at a thickness of 4 micrometers or less. A case in which spherical aberrations is not corrected will be evaluated next. It can be seen that, when the spherical aberration upper limit is set to the same value as the DVD-ROM standard value, when utilizing a blue laser at NA0.85, a deviation (offset) of 5 micrometers from the optimal focus position is allowed. Therefore, in the case of an eight-layer disk, and when the optimum focus position is the center of the eight layers, then the inter-layer spacing is 5÷3.5=1.4 micrometers. Therefore, under these conditions, no mechanism for adjusting the spherical aberration is needed if the inter-layer spacing is shifted within 1.4 micrometers.

In the case of a conventional multilayer disk, reducing the layer cross-talk requires the thickness of each of the intermediate layers to be set to different values, as reported, for example, in the Japanese Journal of Applied Physics Vol. 43, pp. 4983-4986. However, in accordance with the present invention, the layer cross-talk is already sufficiently low, so that all of the intermediate layers can be made to have the same thickness. Using the same layer thickness makes it possible to utilize the same equipment for forming all of the intermediate layers, so that the disk fabrication costs can be reduced.

Therefore, the present invention can achieve a recording capacity of 100 GB in a single layer, or a recording capacity from 500 GB to 1 TB in multiple layers, on a medium the size of a CD.

The method for fabricating the disk of the present invention will be described next. There are multiple methods for fabricating disks having the structures shown in FIG. 1A and FIG. 3A. Several of those methods will be described next.

The simplest method is to directly record a mark on the phase-change film, and to utilize the difference in solubility of the alkaline solvent on the phase-change film in the amorphous and crystalline states to leave only the mark section. That process is shown in FIGS. 6A to 6I. The film is laminated as shown in FIG. 6A prior to recording the mark. The phase-change recording film is in an amorphous state when formed by sputtering, and so it is crystallized, as shown in FIG. 6B. To obtain the crystallized state, the sample may be baked, or it may be irradiated with a laser light and the heat generated by absorbing the laser light in the recording film may be utilized. In FIG. 6B, a laser light is irradiated onto the sample to record the marks, and the protective film is stripped away, as shown in FIG. 6D. The adhesiveness with the phase change recording film is low when a material such as $SiO_2$ is the protective film, and so, peeling away the protective film is comparatively easy. Even if a section of $SiO_2$, for example, remains on the phase-change film, it can easily be removed in the next etching process.

In FIG. 6D, the sample is immersed in alkaline solvent and the crystalline section is dissolved to form the concave/protruding pits, as shown in FIG. 65. A protective film and a reflective film are then formed on this sample, and with bonding of the substrate, such as with a UV resin for the disk, as shown in FIG. 6F, a disk as shown in FIG. 1A is formed. However, in the state shown in FIG. 6F, if irregularities of concavities and protrusions still remain on the reflective film, in this point the disk will differ from that shown in FIG. 1A.

In the next step after the step shown in FIG. 6E, to obtain the structure of FIG. 1A, only the protective film is formed. The pits in the phase-change recording film are crystallized at this time. When this sample is immersed in an alkaline solvent for a short time, the surface section of the phase-change recording film is dissolved away, and then just the protective film on the pit section of the phase-change film is lifted off to form a flat plane, as shown in FIG. 6H. Alternatively, when the protective film is $SiO_2$, the sample material may be immersed in the liquid just long enough for the protective film to be stripped away before the pit section melts. In this case, there is no need to prepare an alkaline solution as the liquid, and water, for example, may be used. In FIG. 6H, the reflective film is formed on the sample material, and with bonding to the substrate, a disk with the same structure as shown in FIG. 1A can be obtained.

In the method shown in FIGS. 6A to 6I, one mark at a time must be recorded, and, therefore, time is required in order to fabricate one disk. However, when making a typical ROM disk, the marks are first recorded one at a time forming, concavities/protrusions to form a master disk. A stamper is then produced using that template. Dissolved polycarbonate is then poured into the stamper to fabricate the concavity/protrusion pattern. This device is called an injection mold. This process requires time to make the stamper, but once the stamper has been made, the production time required for each disk is extremely short.

One way to resolve the problems described above for the method of FIGS. 6A-6I is the method shown in FIGS. 7A to 7D. Here, a protective film 702 and a phase-change film 703 are formed on the substrate 701. A heated stamper 704 is pressed onto the phase-change film. Only the protruded regions on the stamper contact the phase-change film. The temperature on the section of the phase-change film that contacts the stamper rises and that section crystallizes. The pattern on the stamper is, in this way, transferred to the phase-change film 703 and the recording mark 705 is formed. Pits are made from this phase-change material as shown in FIG. 7D, by etching the material with an alkaline solvent. This state is the same as that shown in FIG. 6E, so that the remainder of the process is identical to that in FIGS. 6A-6I. The time required for transferring the mark pattern to the disk by the method shown in FIGS. 7A-7D is approximately the same as that used in injection molding when fabricating a normal ROM disk, and the disk fabrication time can be shortened.

The stamper 704 is made from the master disk, however, the master disk can be fabricated in the same manner as a conventional ROM disk by irradiating a short wavelength laser onto the sample material, which is a glass substrate coated with a resist. The marks can also be fabricated by an electron beam, since the size of the marks for achieving the high density recording provided by the present invention is extremely small. Phase-change recording is satisfactory for high density recording, so that the method in FIG. 6A through 6E may be utilized just when fabricating the master disk, and the method for fabricating a stamper using the master disk of FIG. 6E may also be employed.

Moreover, a disk can be fabricated utilizing the wettability of the phase-change film. The sample material is comprised of a substrate 801, a protective film 802, and phase-change film as shown in FIG. 8A. The phase-change film includes both an amorphous section 803 and a crystallized section 804. Fluid drops 805 of the etching solvent are placed on the amorphous section 803 and crystallized section 804. For the next several seconds or minutes, the crystallized section 804 repels these etching fluid drops 805, and the drops 805 move to the amorphous section 803. This process can be explained as follows. The surfaces of both the amorphous section 803 and crystallized section 804 are oxidized in the air. This oxidized layer is several nm thick and serves to block corrosion due to the etching fluid. However, the crystallized section is polycrystalline, and, therefore, corrosion occurs at the crystal grain boundary, so that the resistance to etching is low there. Therefore, the oxidized surface of the crystallized section is etched, and only the bulk portion of the crystallized section makes contact with the etching fluid drops. The phase-change recording film has a higher polarizability in an oxidized state than the bulk portion. Generally, the greater the polarity of the solid, the greater the wettability with water. Therefore, in the phase-change recording film, the oxidized film on the surface possesses high wettability from the etching fluid, so that, as shown in FIG. 8B, etching drops are repelled more quickly on the crystallized section with corrosion from the oxidized surface film and the drops will move to the amorphous section.

A disk fabrication method utilizing this process is shown in FIGS. 9A to 9H. The phase-change mark pattern is formed as shown in FIG. 6D and FIG. 7C. An etching fluid with suspended amphiphilic molecules containing both hydrophilic and hydrophobic group characteristics is coated on the surface of the sample material. The section shown in FIG. 9B by the circles among the amphiphilic molecules is the hydrophilic group, and the section shown by the lines is the hydrophobic group. The etching fluid is an alkaline solvent, and the thermodynamic properties are similar to water, so that the hydrophilic group makes contact with the etching fluid and the hydrophobic group faces the outer atmosphere side. The surface oxidation of the crystallized section in the state shown in FIG. 9B is dissolved, and the etching fluid is repelled, as shown in FIG. 9C. The etching fluid here evaporates and attains the state shown in FIG. 9D. In this state, contact is made with the substrate containing the protective film, and the amphiphilic molecules are moved, as shown in FIG. 9F. A phase-change film is formed on this sample material and when the section with the amphiphilic molecules is lifted off by dissolving the amphiphilic molecules with solvent, a pit pattern of phase-change material can be formed, as shown in FIG. 9H. The state shown in FIG. 9H is the same as that shown in FIG. 6E, so that the method in FIGS. 6A-6I can be used from here onward.

When fabricating the next disk, the stamper of FIG. 6A can be used, and, if starting again from FIG. 9B, then the state shown in FIG. 6H can be fabricated at high speed so that the disk can be produced in a short time.

This method for forming a film in this way utilizing amphiphilic molecules is the same as the method used to fabricate the Langmuir-Blogett (LB) film. The technology has already been established, and so the method of FIGS. 9A-9H can be accomplished without problems. The amphiphilic molecules used here may be fatty acids, such as oleic acid, linoleic acid, or stearic acid that are often utilized in LB film. A phosphoric fatty acid, which consists of molecules comprising biomembranes, may also be utilized.

This disk fabrication method can also be applied to multi-layer disks. This method is shown in FIGS. 10A to 10F. FIG. 10A shows the state prior to bonding the upper substrate of FIG. 6I. The disk can be fabricated with methods shown in FIGS. 6A-6I, FIGS. 7A-7D, or FIGS. 9A-9H. In this state, an intermediate layer 1006 is formed for the purpose of separating the layers. This intermediate layer can be formed by spin coating with a hardened UV curable resin, or a method that bonds a plastic film, such as a polycarbonate, with a UV curable resin, the same as when forming intermediate layers on conventional multi-layer optical disks. The protective film and the phase-change film are formed in the state shown in FIG. 10B, and the mark patterns are recorded on the phase-change film with any of the methods of FIGS. 6A-6I, FIGS. 7A-7D, or FIGS. 9A-9H. This disk is then etched with an alkaline solvent to form the pits from the phase-change material to attain the state shown in FIG. 10S. This sample material is then set to the state shown in FIG. 10F per the method shown in FIGS. 6A-6I. If forming a two-layer disk, then the upper substrate may be bonded to the surface shown in FIG. 6F. If forming a three-layer disk, then the process may be performed again starting from FIG. 10B.

The present invention makes it possible to read out data recorded on an optical disk possessing a capacity of approximately 100 gigabytes per surface, while utilizing a system with a conventional optical disk drive. Moreover, utilizing multiple layers makes it possible to produce an optical disk possessing a capacity of approximately one terabyte.

BRIEF DESCRIPTION OF THE DRAWINGS

FIG. 5 is a table of the disk structures and their typical optical characteristics when applied to the multi-layer disk of the present invention;

FIG. 16 is a table showing the readout signal error rate and the readout power of each layer of the eight layer disk, obtained in a fifth embodiment of the present invention.

DETAILED DESCRIPTION OF THE PREFERRED EMBODIMENTS

First Embodiment

Figure 1A:
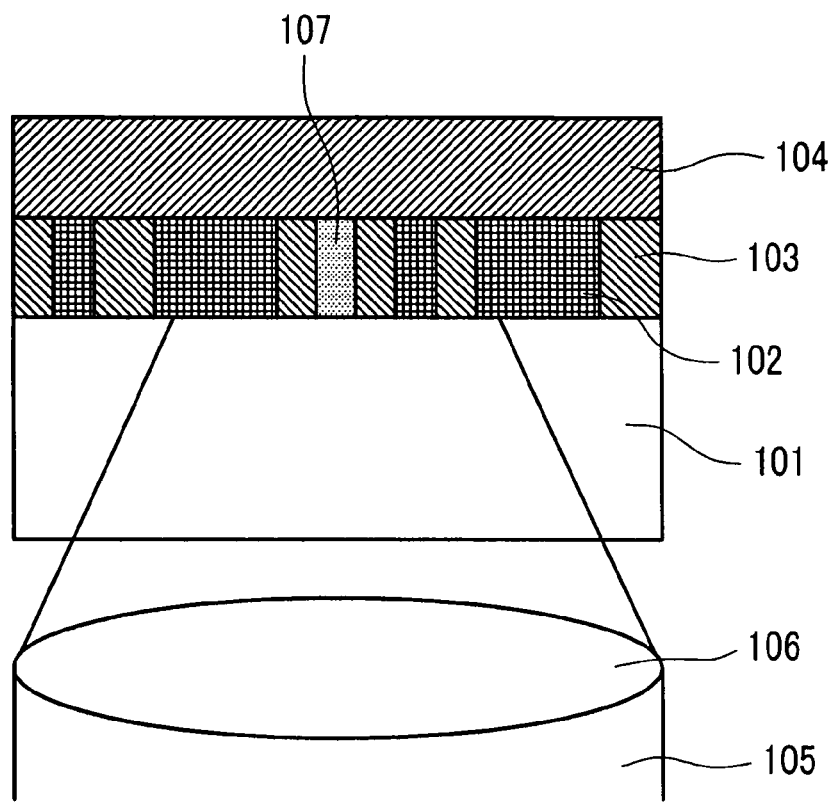
FIG. 1A is a cross sectional view of the disk of the present invention.
Figure 1B:
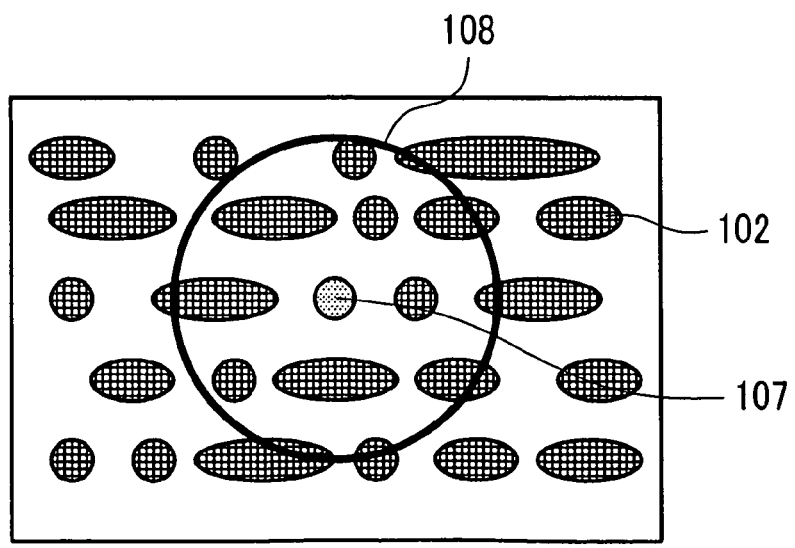
FIG. 1B is an upper plan view of the disk of the present invention.
Figure 2A:
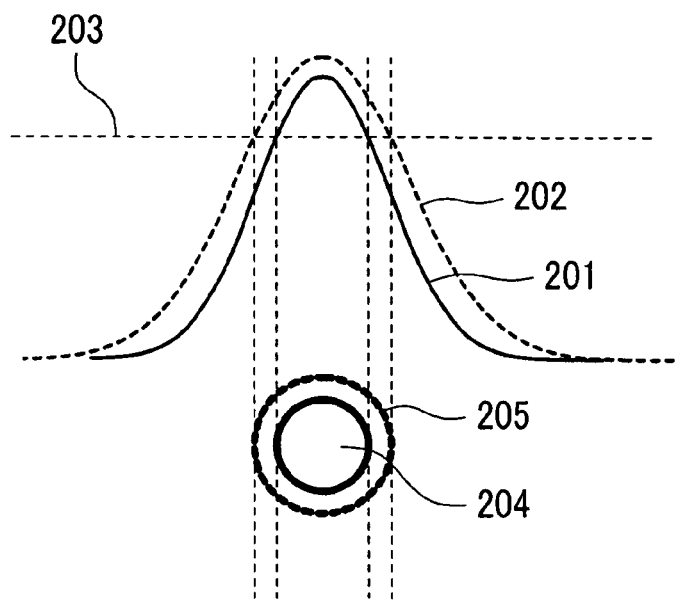
FIG. 2A is a diagram illustrating the relation of the gaussian beam power jitter to the effective readout spot size jitter in the conventional super-resolution technology.
Figure 2B:
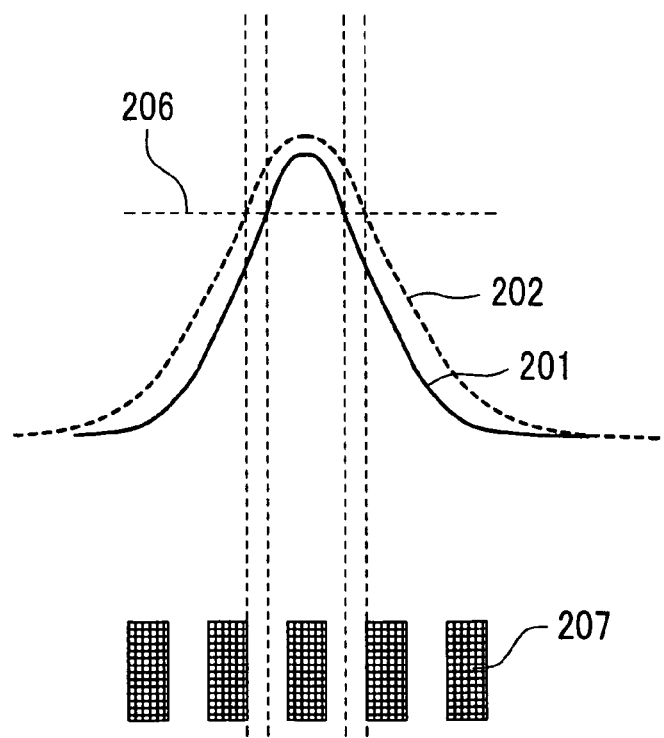
FIG. 2B is a diagram illustrating the relation of the Gaussian beam power jitter to the effective readout spot size jitter in accordance with the super-resolution technology of the present invention.
Figure 3A:
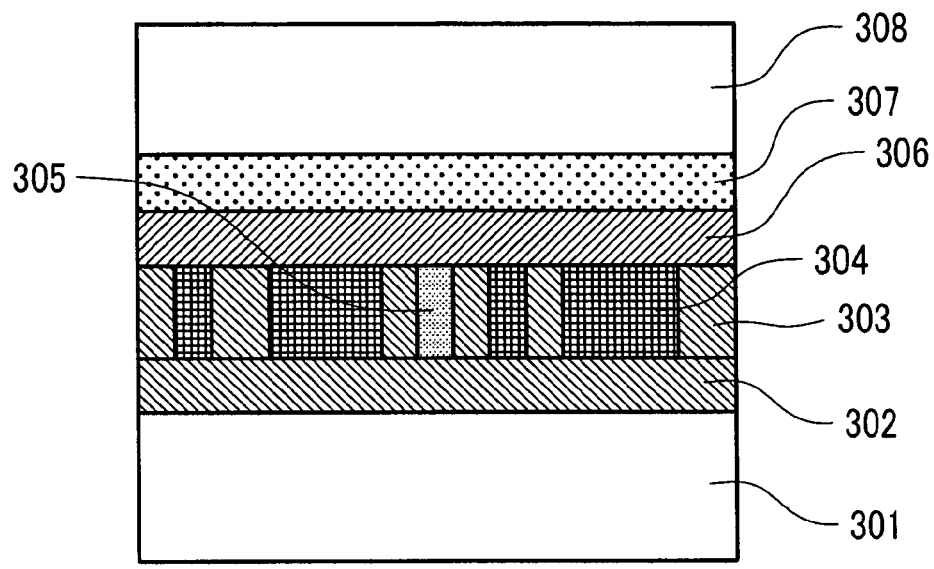
FIG. 3A is a cross sectional view of a typical disk structure implementing the present invention.
Figure 3B:
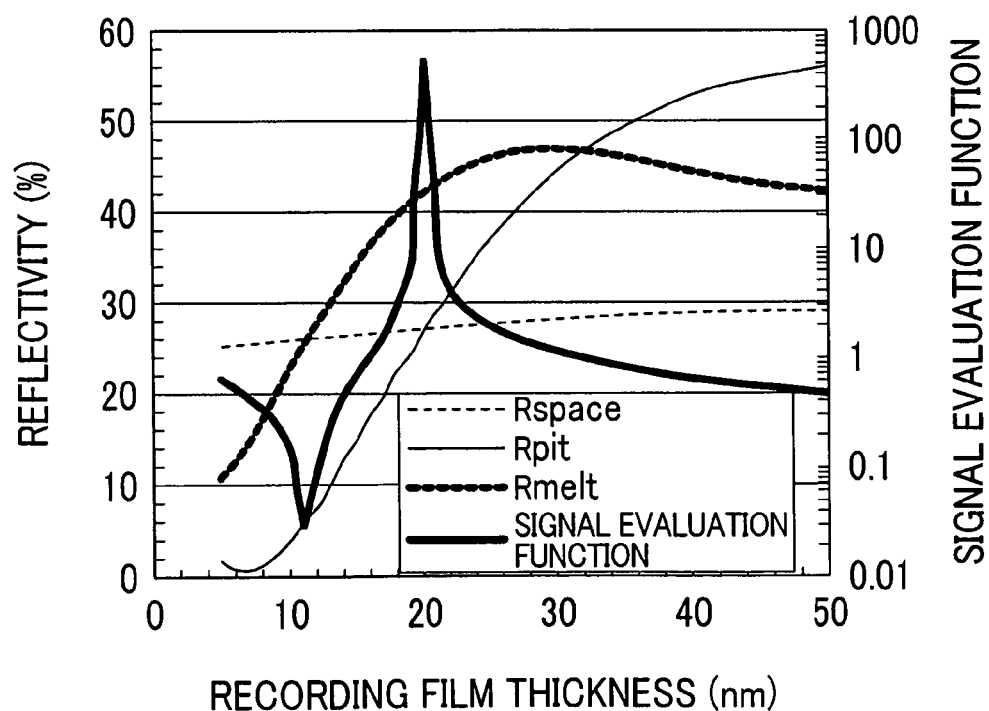
FIG. 3B is a graph showing results calculated for the inter-relation of the recording film thickness, and the reflectivity and the signal evaluation function.
Figure 4:
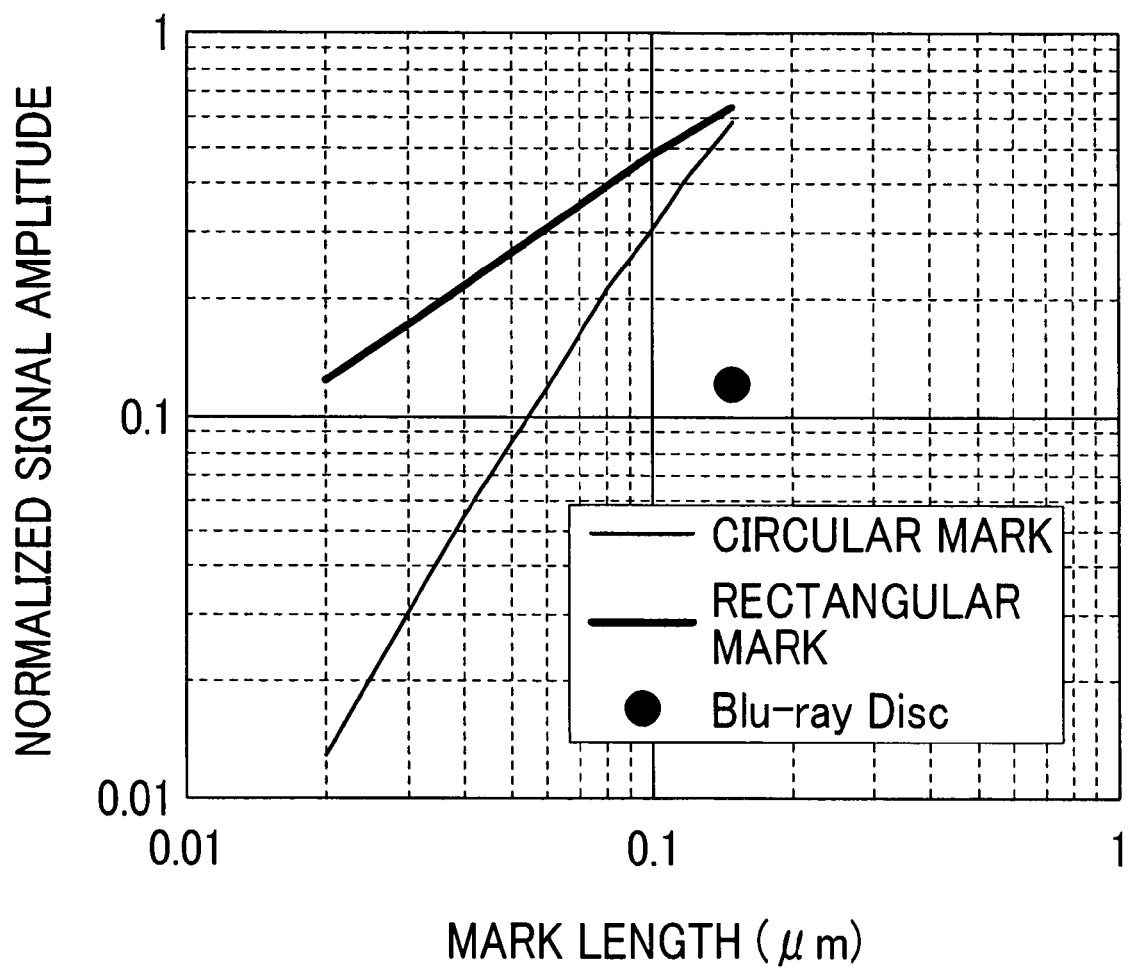
FIG. 4 is a graph showing results calculated for the inter-relation of normalized signal amplitude and mark length in accordance with the present invention.
Figure 6A:
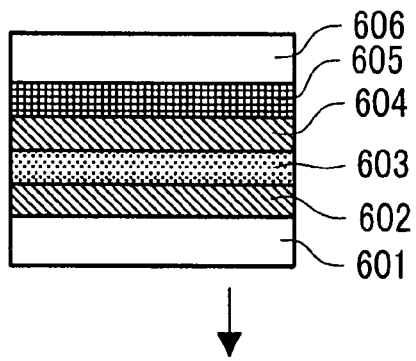
FIG. 6A is a diagram showing a step in the disk fabrication method of the present invention, and a method for directly recording the marks.
Figure 6B:
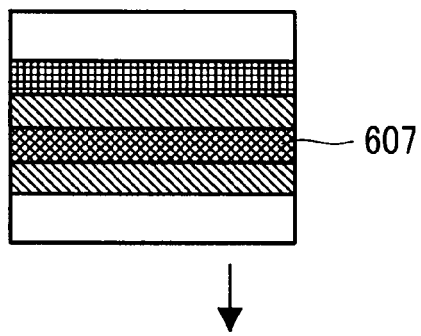
FIG. 6B is a diagram showing a step in the disk fabrication method of the present invention, and a method for directly recording the marks.
Figure 6C:
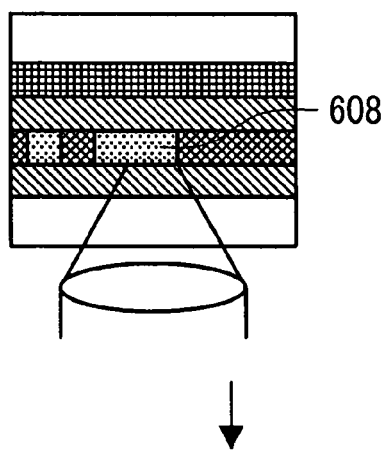
FIG. 6C is a diagram showing a step in the disk fabrication method of the present invention, and a method for directly recording the marks.
Figure 6D:
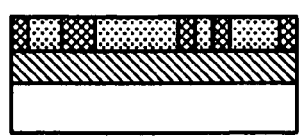
FIG. 6D is a diagram showing a step in the disk fabrication method of the present invention, and a method for directly recording the marks.
Figure 6E:
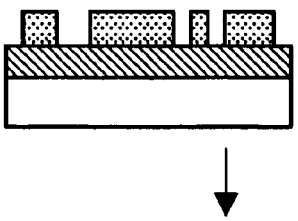
FIG. 6E is a diagram showing a step in the disk fabrication method 20 of the present invention, and a method for directly recording the marks.
Figure 6F:
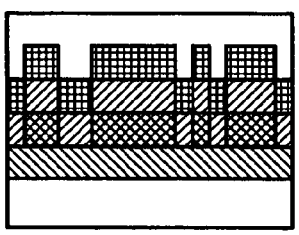
FIG. 6F is a diagram showing a step in the disk fabrication method of the present invention, and a method for directly recording the marks.
Figure 6G:
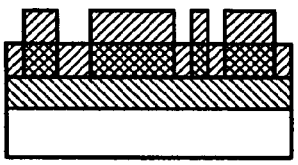
FIG. 6G is a diagram showing a step in the disk fabrication method of the present invention, and a method for directly recording the marks.
Figure 6H:
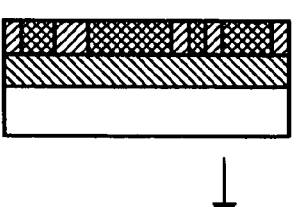
FIG. 6H is a diagram showing a step in the disk fabrication method of the present invention, and a method for directly recording the marks.
Figure 6I:
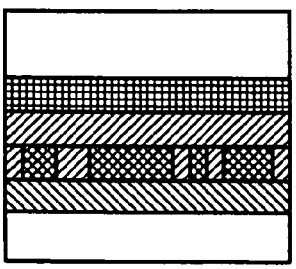
FIG. 6I is a diagram showing a step in the disk fabrication method of the present invention, and a method for directly recording the marks.
Figure 7A:
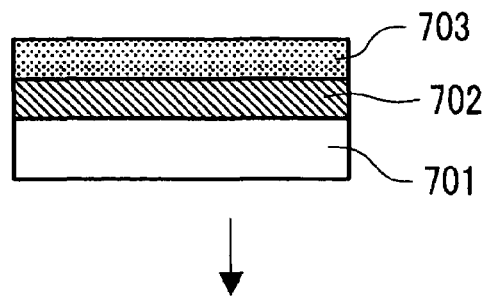
FIG. 7A is a diagram showing a step in the forming of the mark patterns by making contact with a hot stamper in an example of the disk fabrication method of the present invention.
Figure 7B:
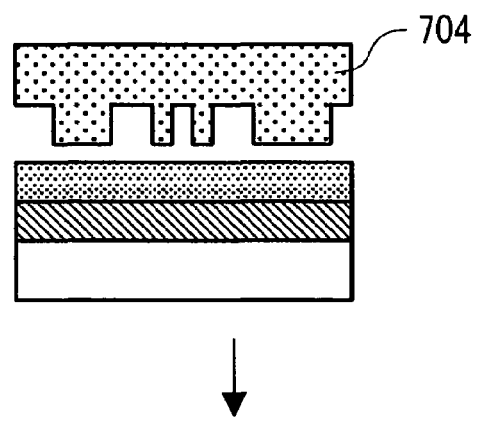
FIG. 7B is a diagram showing a step in the forming of the mark patterns by making contact with a hot stamper in an example of the disk fabrication method of the present invention.
Figure 7C:
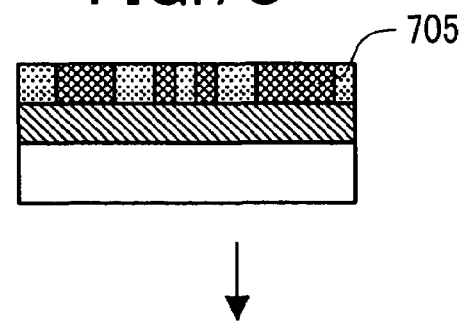
FIG. 7C is a diagram showing a step in the forming of the mark patterns by making contact with a hot stamper in an example of the disk fabrication method of the present invention.
Figure 7D:
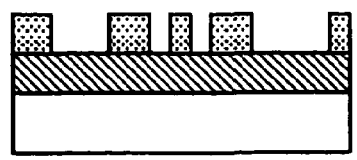
FIG. 7D is a diagram showing a step in the forming of the mark 20 patterns by making contact with a hot stamper in an example of the disk fabrication method of the present invention.
Figure 8A:
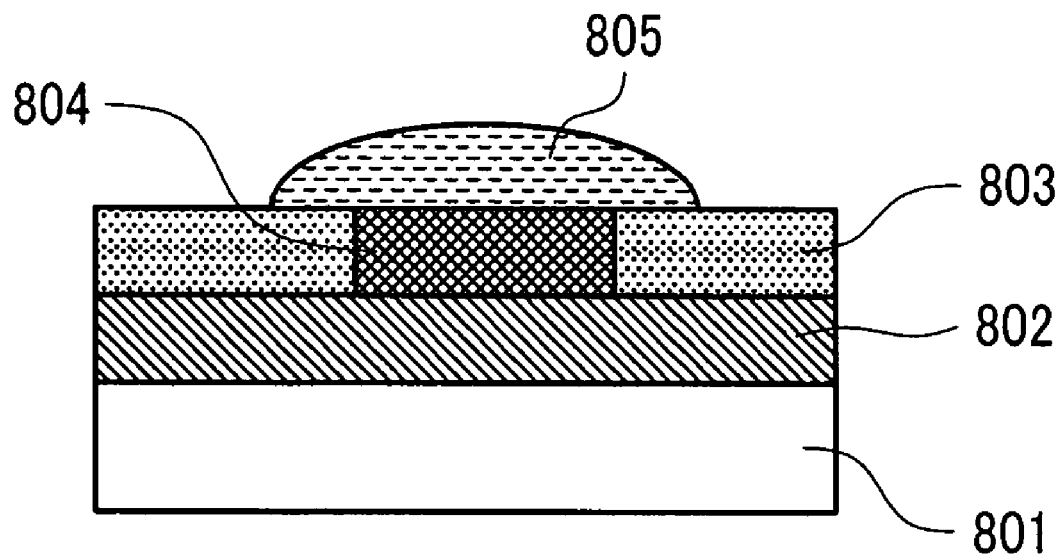
FIG. 8A is a diagram showing the change in wettability in the crystallized and amorphous sections immediately after moistening the phase-change film in the etching fluid.
Figure 8B:
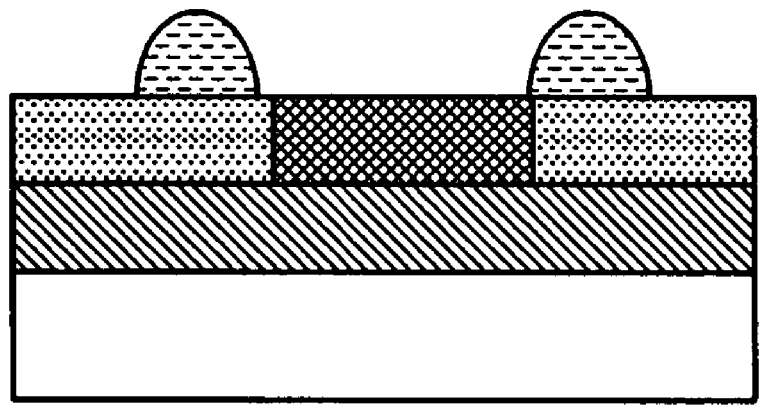
FIG. 8B is a diagram showing the change in wettability in the crystallized and amorphous sections several minutes after moistening the phase-change film in the etching fluid.

A single layer disk was fabricated to evaluate the effect of the present invention. The disk was fabricated by utilizing the method shown in FIGS. 6A-6I. An upper substrate in FIGS. 6A-6I is made from polycarbonate and has a thickness of 1.2 mm. A reflective film 605 is made from silver (Ag) and has a thickness of 20 nm. An upper protective film 604 is made from ZnS—$SiO_2$ and has a thickness of 30 nm. A phase-change film 603 is made from $Ge_5Sb_{70}Te_{25}$ and has a thickness of 20 nm. A lower protective film 602 is made from $SiO_2$ and has a thickness of 55 nm. A lower substrate 601 is provided as a 0.1 mm thick sheet of polycarbonate and is bonded by UV curable resin. The structure of that film is shown in FIG. 3A and the signal evaluation function calculated at the maximum is shown in FIG. 3B. The films were all formed by sputtering. The films were sputtered on the upper substrate 606 in the sequence of the reflective upper protective film, the phase-change film, and the lower protective film.

The phase-change film of this sample material is crystallized by a phase-change disk initializer. The laser wavelength of the initializer is 830 nm and the NA of the objective lens is 0.5. The spot when focused possesses a length of approximately 200 μm radially along the disk, and it possesses a length in the disk rotation direction determined by the λ/NA, or, in other words, a length of approximately 1.7 μm. During crystallization, the sample material rotates at a linear speed of 3 meters per second, and a DC laser beam is irradiated at a power of 300 mW.

Figure 11:
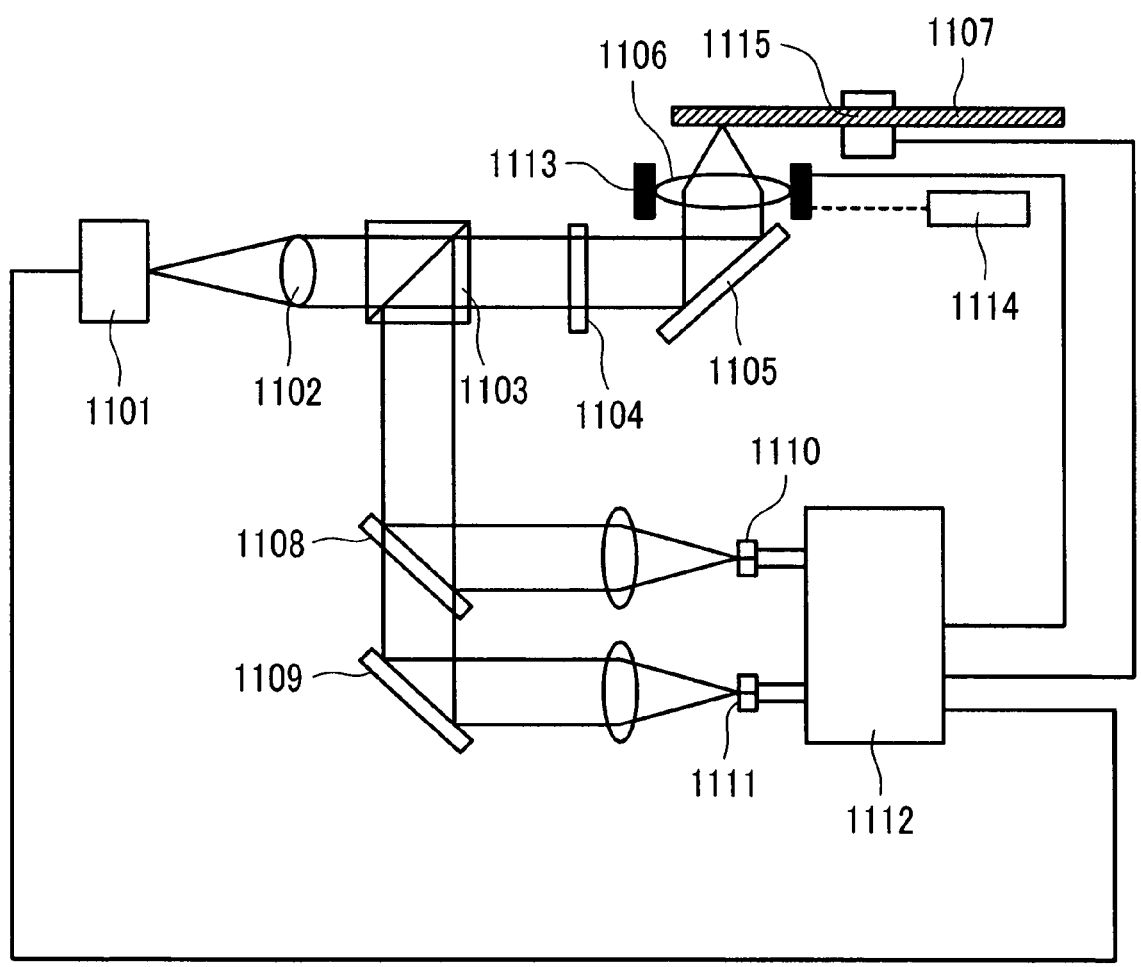
FIG. 11 is a schematic diagram of the structure of the readout device utilized in an embodiment of the invention.

The amorphous mark pattern is recorded by the device shown in FIG. 11 on this disk, and the disk is fabricated. During etching, the sample material is immersed for 20 minutes in a sodium hydroxide solution at pH12.

The data was read out using the same device as utilized for the recording. This device combines the functions of both a conventional disk tester and a device for fabricating a ROM disk. The structure of this device will be described next with reference to FIG. 11. A laser light is emitted from a semiconductor laser 1101, and the light is converted into a collimated beam by a lens 1102. This collimated beam is passed through a polarized beam splitter 1103. The laser light emitted from the semiconductor laser 1101 at this time is linear polarized light. However the polarized beam splitter 1103 is adjusted so that the direction of this polarized light passes completely through the polarized beam splitter 1103. The laser light is converted to circularly polarized light by the λ/4 plate 1104 and is focused on the disk 1107 via the mirror 1105 and the objective lens 1106. The light reflected from the disk passes through the mirror 1105 and objective lens 1106, and it becomes linear polarized light in the λ/4 plate 1104. However, that light is directed in a direction 90 degrees different from that when it is emitted from the laser 1101. Therefore, when this light is irradiated into the parallel beam splitter 1103, the optical path is bent 90 degrees and is irradiated via the mirrors 1108 and 1109, respectively, into a focus signal detector 1110 and a readout signal-tracking signal detector 1111. The signals from both detectors are input to a signal processor-controller system 1112. The radial position of the head is simultaneously detected by the laser interferometer 1114, and a position signal is input to the system 1112. This system 1112 controls the auto-focusing servo, the tracking signal, the laser pulse emitter signal, and the disk rotation speed, etc.

The auto-focusing servo can be utilized during recording for fabricating the disk. However, there are no marks, so that no tracking servo signal can be obtained. Therefore, the system 1112 sends a signal to the head actuator 1113 in order to control the head position based on the output of the laser interferometer 1114 during recording. The system 1112 sends a signal to the spindle 1115 in order to control the disk rotation speed based on the signal from the interferometer 1114, so that the linear speed is always uniform during write/read, or, in other words, a constant linear velocity (CLV) is attained. During recording, the semiconductor laser 1101 must emit a laser pulse corresponding to the mark pattern for recording, and so the system 1112 sends a laser pulse signal to the laser 1101.

The wavelength of the laser 1101 used here is 405 nm, and the NA of the objective lens 1106 is 0.85. These are the same conditions as used for the Blu-ray disc.

Figure 12:
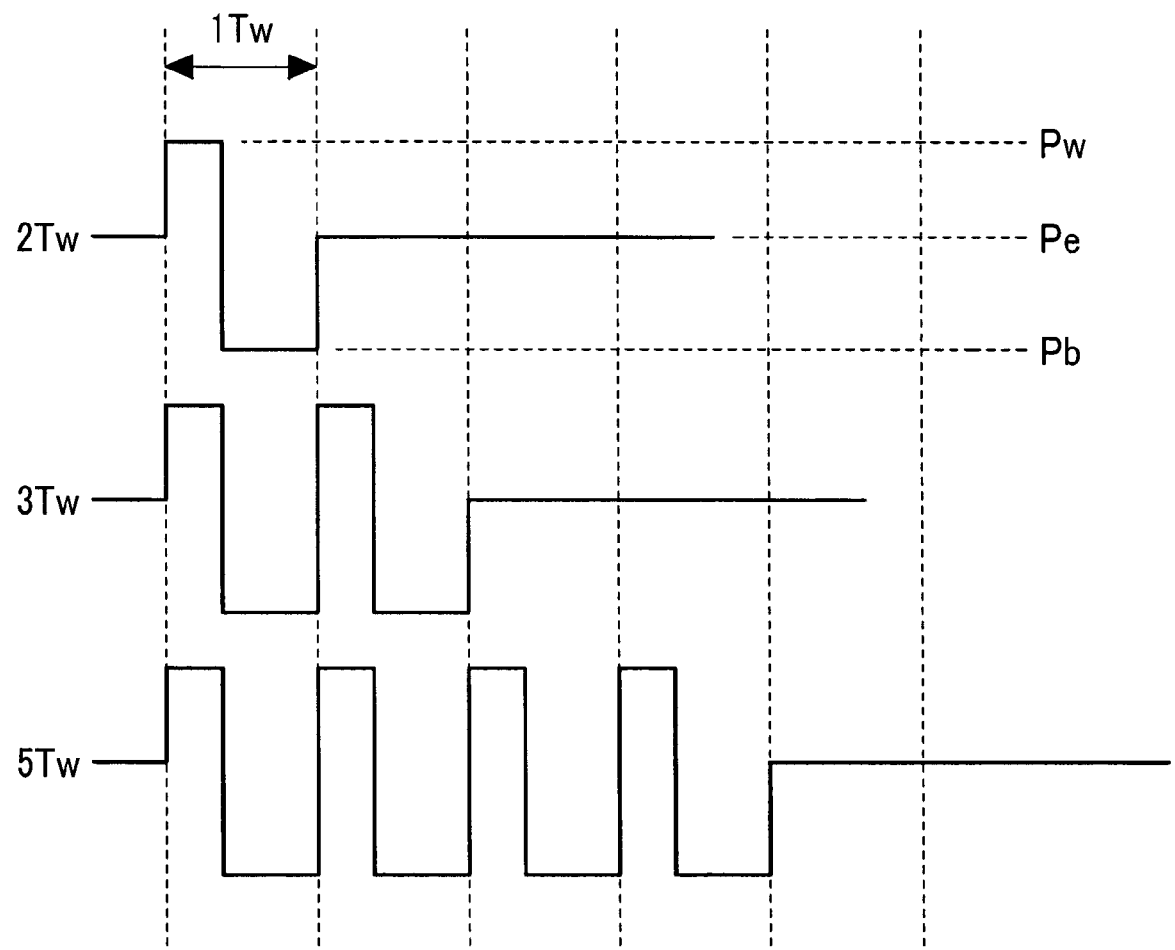
FIG. 12 is a graph showing waveform during emission of the laser beam when recording amorphous marks in accordance with the present invention.

The waveform of the laser pulse for recording is shown in FIG. 12. The recording modulation code used here is the (1,7) modulation code, where the shortest mark is double (or 2Tw) the detection window width Tw, and the longest mark is 9Tw. The pulse is made up of a record power level PW, a bottom power level Pb, and an erase power level Pe. The nTw mark is recorded with the (n−1) pulses. FIG. 12 shows the recording pulses for 2Tw, 3Tw, and 5Tw. In one pulse in this embodiment, the Pw length is ⅜Tw and the Pb length is ⅝Tw, and the Pw, Pb, Be values are, respectively, 4.5 mW, 0.1 mW, and 2.0 mW. The track width during recording is 0.24 μm.

The tracking method that is employed is the phase differential detection method, which is the same method used for readout on a conventional ROM disk. More specifically, in this method, the signal from the readout signal-tracking signal detector 1111 is split into four signals, and the differential of the sum of the diagonal components of these respectively obtained signals are set to zero (0). When this method is applied to a conventional disk, the track error signal becomes small as the mark length decreases, so that the tracking servo is unusable. However, in accordance with the present invention, a single pit is melted and a signal is obtained only for that pit, so that the track error signal does not become extremely small and the tracking servo is usable.

Figure 13:
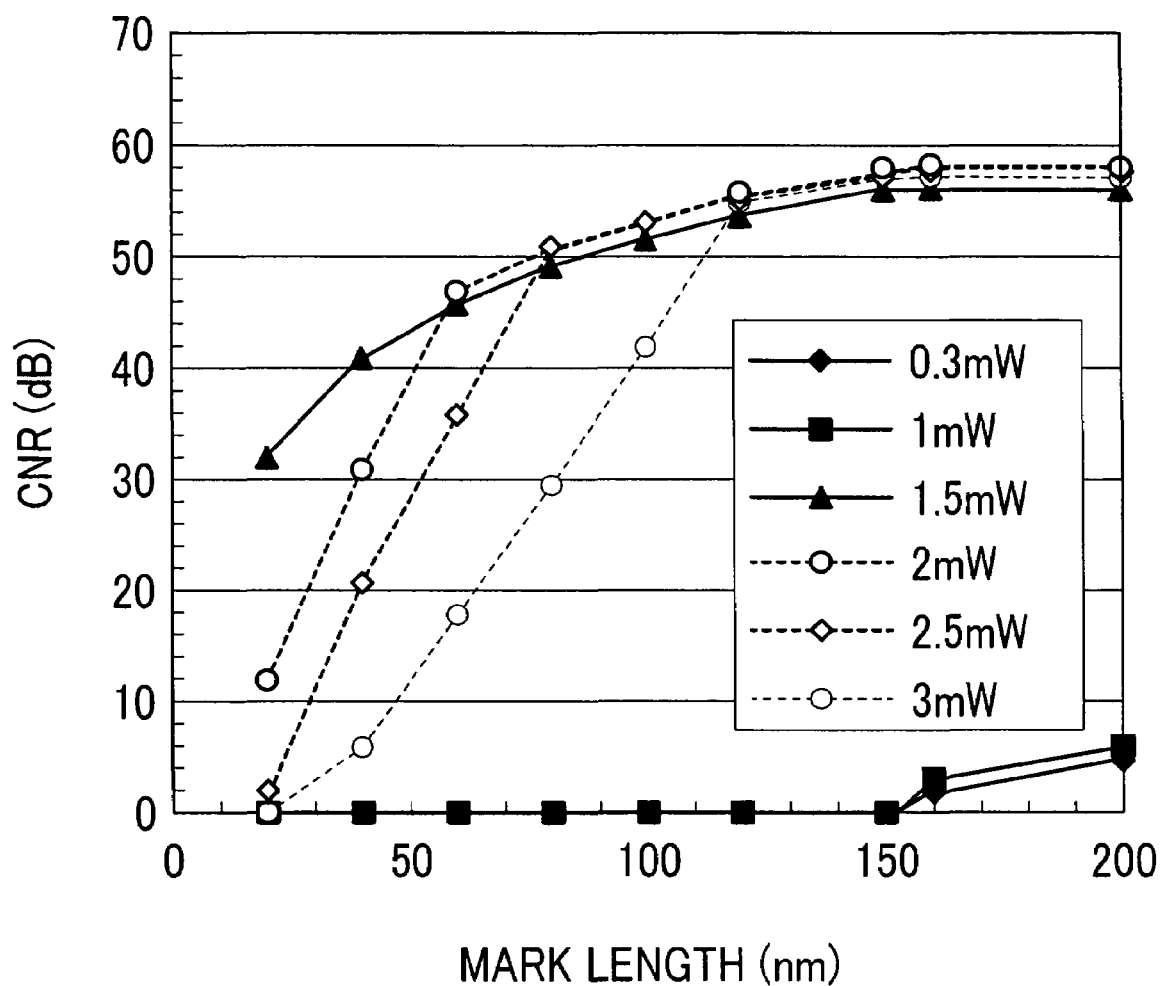
FIG. 13 is a graph showing the dependency of the readout power and the CNR mark length of the readout signal obtained in the first embodiment of the present invention.

To investigate the effect of the invention separately from the random patterns obtained from the above described (1,7) modulation code, a single pattern whose mark length and space length are the same length was recorded to allow the carrier to noise ratio (CNR) to be measured. The relation of the mark length to the carrier noise ratio (CNR) was examined at different readout powers, and the results are shown in FIG. 13. In FIG. 13, almost no signal is obtained at a readout power of 0.3 mW and 1 mW. This lack of signal is due to the fact that the reflectivity of the mark and the space are nearly equivalent when the pit section on the phase-change film has not melted, as was described previously for FIGS. 3A-3B. An extremely large signal is obtained when the readout power is 1.5 mW, and even when the mark length is 40 nm, the CNR is approximately 40 dB. However, the CNR for a small mark length becomes smaller as the readout power increases. This decrease in the CNR can be attributed to the melting area becoming larger as the readout power increases, so that the pits adjacent to the small mark length section also melt, and the effective resolution declines. The size of the melting area also depends on the disk structure and optical conditions, so that the optimal readout power depends on the disk, drive, and shortest mark length. An optimal readout power of approximately 1.5 mW is estimated for the disk and optical conditions used here.

Testing carried out on a conventional disk will be described next. On disks not utilizing super-resolution, there is virtually no change in the CNR even if the readout power is changed. The lack of change in the CNR is due to the fact that there is no change in optical resolution even if the readout power is changed, so that, though the signal improves in proportion to the increased reflectivity, the noise also increases by a corresponding amount. The optical resolution was mainly $\lambda/4NA$. At a lower mark length, the signal amplitude is nearly zero (0). In other words, that approximately 120 nm at the Blu-ray disc conditions.

An example of the CNR when utilizing super-resolution is described in the Japanese Journal of Applied Physics Vol. 43 pp. 4921-4924. Here, a signal was definitely obtained at a mark length of 50 nm and an improved optical resolution was observed. However, a CNR of 48 dB was only obtained at a mark length of 100 nm at the 2T mark on a Blu-ray Disc. One reason is considered to be the super-resolution noise. In contrast, a CNR of 48 dB was achieved at a mark length of 60 nm, and this verifies the effect of the present invention.

Random marks, with the shortest mark being 40 nm, were read S out. The PRML (Partial Response Most Likelihood) method, which is one type of signal processing method as reported in the Japanese Journal of Applied Physics, Vol. 39, pp. 824-829, was utilized here during readout. The readout data error was $2.2 \times 10^{-6}$. The usual upper limit for error rates allowing readout of data with virtually no errors using error correction codes is $1 \times 10^{-3}$. The error rate obtained here was sufficiently lower than that upper limit, and therefore is a value satisfactory for actual use.

Results from dismantling a disk and observing the mark shapes with an electron microscope showed that the shapes all resembled a so-called chevron mark. The width of the marks, at the shortest mark length of 40 nm, was approximately 80 nm. The reason for the chevron marks is thought to be due to results from recrystallization at the Pe level in the recording pulse waveforms shown in FIG. 12. This recrystallization most likely makes it possible to sufficient amplitude for a mark with a 40 nm length. For the above reasons, a disk having the size of a CD can be fabricated with a capacity of 125 gigabytes.

A disk tester capable of both recording and reading marks onto a disk was fabricated, and testing was performed. However, the functions used during readout of data on this disk tester are nearly the same as the functions of a conventional disk drive. Therefore, the results obtained here can even be obtained on a conventional disk drive. However, the readout power used here was 1.5 mW, which is a high value compared to the conventional readout level. In other words, the effect of the present invention can be obtained if a function to boost the readout power can be added to the currently used disk drive product, so that the currently used product is compatible with the present invention.

Second Embodiment

Data on the disk fabricated by the method shown in FIG. 7 was read out and the error rate measured.

The method described in the first embodiment was utilized to record the data on the disk. The (1,7) modulation method was used for modulation coding, and the shortest mark length was set at 40 nm. A disk was fabricated using the method shown in FIGS. 6A-6I in connection with the first embodiment. The state shown in FIG. 6E, however, was used for the mold utilizing a CV curable resin, and that resin was plated with nickel to obtain the master disk. A stamper of nickel was made from this master disk. On the other hand, Ag having a thickness of 20 nm, $ZnS$—$SiO_2$ having a thickness of 30 nm, and $Ge_2SbsTe_5$ serving as a phase-change material and having a thickness of 20 nm was sputtered onto a 1.2 mm thick polycarbonate substrate. A nickel stamper heated to 200° C. was brought into contact with the sample material for one second to form a crystallized mark pattern on the sample material. The sample material was loaded on a spin coater with the film surface facing upwards and the inner side of the sample material was moistened in a sodium hydroxide solution of pH13.5 while rotating at 600 rpm. The sections in a crystallized state were dissolved, and the phase-change material pits were formed by moistening them in the sodium hydroxide solution while spinning for three minutes. This sample material was sputtered with $SiO_2$ to 55 nm and bonded to a 0.1 mm thick polycarbonate sheet with UV curable resin.

Figure 14:
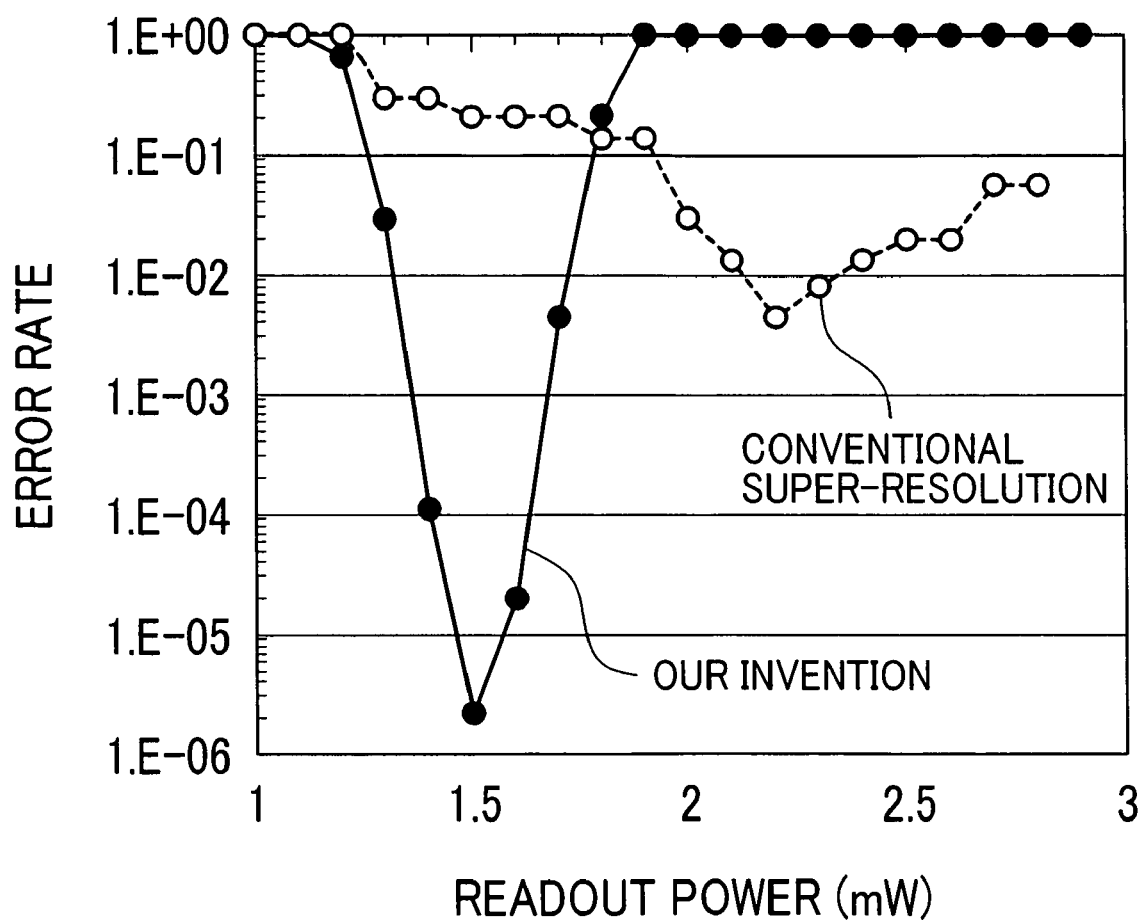
FIG. 14 is a graph showing the dependency of readout power on the error rate of the readout signal obtained in the second embodiment of a present invention.

The data on this disk was read out on the same disk tester as shown in FIG. 11. The actual measured values (our invention) for the relation of readout power to error rate are shown in FIG. 14. Data on error rates measured on conventional super-resolution disks are also shown in FIG. 14 for purposes of comparison. Among the error rates for our disk obtained from the conventional super-resolution disk, the best error rate was $4.2 \times 10^{-3}$, which was larger than the maximum required error rate value of $1 \times 10^{-3}$. The minimum error rate obtained on the disk of our invention at a readout power of 1.5 mW was $2.2 \times 10^{-6}$. Moreover, an error rate lower than $1 \times 10^{-3}$ was obtained within a readout power of 1.4 to 1.6 mW.

FIG. 14 shows the error rates when reading out data from the disk fabricated with the method shown in FIGS. 7A-7D. The minimum error rate and the readout power at which the minimum error rate was obtained will differ according to the method used for fabricating the disk of the present invention. Therefore, the present invention is not limited to the minimum error rate and readout power values shown in FIG. 14.

Third Embodiment

Data from the disk fabricated by the method shown in FIGS. 9A-9H was read out here.

Figure 9A:
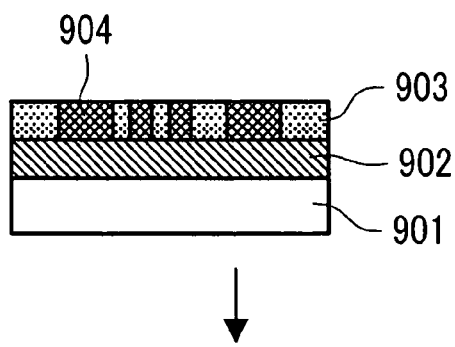
FIG. 9A is a diagram showing a step in a method utilizing the differential in wettability of the surfaces after etching the crystallized and amorphous sections for a short time in the disk fabrication method of the present invention.
Figure 9B:
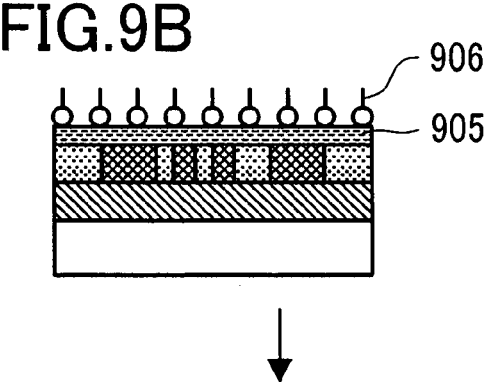
FIG. 9B is a diagram showing a step in the method utilizing the differential in wettability of the surfaces after etching the crystallized and amorphous sections for a short time.
Figure 9C:
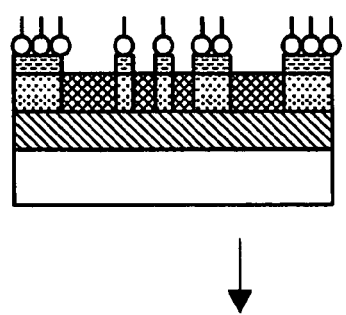
FIG. 9C is a diagram showing a step in the method utilizing the differential in wettability of the surfaces after etching the crystallized and amorphous sections for a short time.
Figure 9D:
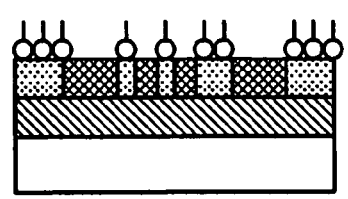
FIG. 9D is a diagram showing a step in the method utilizing the differential in wettability of the surfaces after etching the crystallized and amorphous sections for a short time.
Figure 9E:
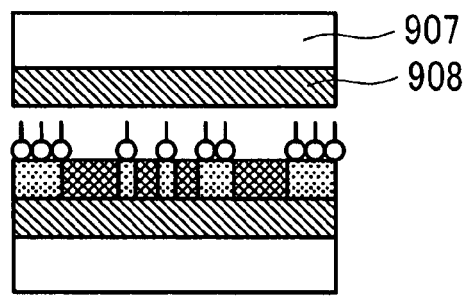
FIG. 9E is a diagram showing a step in the method utilizing the differential in wettability of the surfaces after etching the crystallized and amorphous sections for a short time.
Figure 9F:
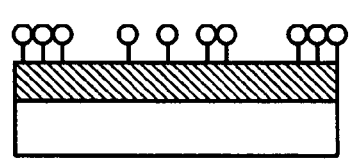
FIG. 9F is a diagram showing a step in the method utilizing the differential in wettability of the surfaces after etching the crystallized and amorphous sections for a short time.
Figure 9G:
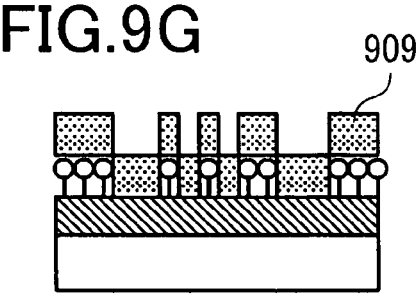
FIG. 9G is a diagram showing a step in the method utilizing the differential in wettability of the surfaces after etching the crystallized and amorphous sections for a short time.
Figure 9H:
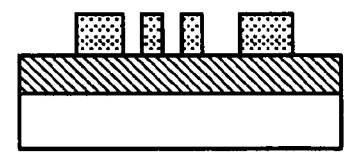
FIG. 9H is a diagram showing a step in the method utilizing the differential in wettability of the surfaces after etching the crystallized and amorphous sections for a short time.
Figure 10A:
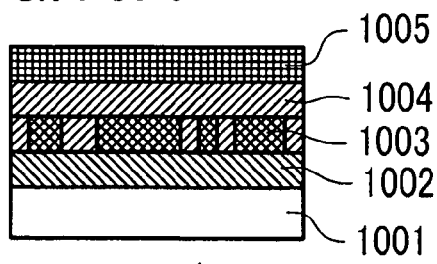
FIG. 10A is a diagram showing as an example a step in the multi-layer disk fabrication method of the present invention.
Figure 10B:
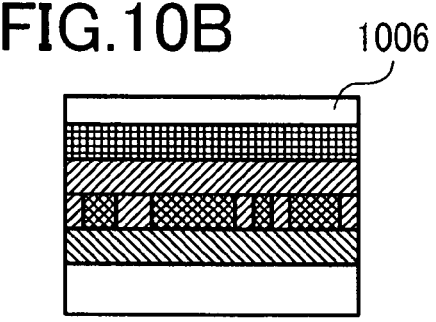
FIG. 10B is a diagram showing a step in the multi-layer disk fabrication method of the present invention.
Figure 10C:
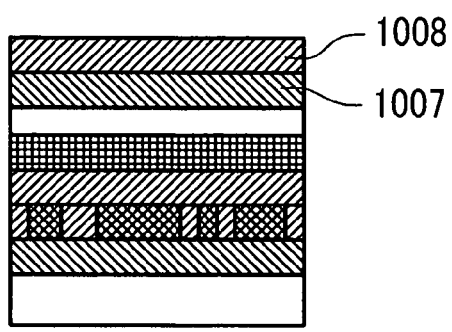
FIG. 10C is a diagram showing a step in the multi-layer disk fabrication method of the present invention.
Figure 10D:
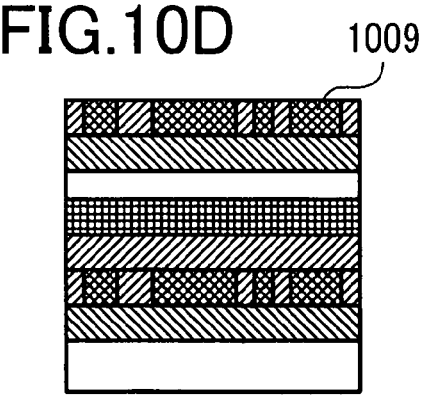
FIG. 10D is a diagram showing a step in the multi-layer disk fabrication method of the present invention.
Figure 10E:
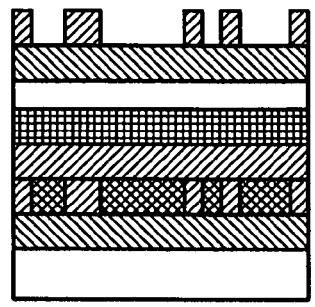
FIG. 10E is a diagram showing a step in the multi-layer disk fabrication method of the present invention.
Figure 10F:
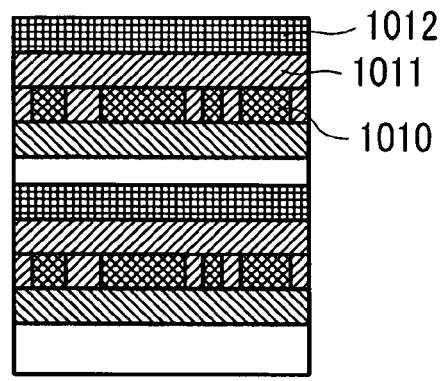
FIG. 10F is a diagram showing a step in the multi-layer disk fabrication method of the present invention.

The methods described in conjunction with the first embodiment and the second embodiment were utilized to record data onto the disk. A sodium hydroxide solution at pH12 was coated on the surface of the sample material in FIG. 9A by utilizing a spin coater. The solution of sodium hydroxide at this time covers a radial section from 20 to 60 mm on the surface of the disk. This section has a surface area of approximately 0.01 $m^2$. This sample material is moistened in 16 milligrams of stearic acid. This section was measured beforehand with 24 milligrams of stearic acid covering a surface area of 0.01 $m^2$ with no gaps. The stearic acid has a diameter of approximately 1 nm, and, further, it has a molecular weight of 284, so that the weight of stearic acid described above is largely a suitable value. At this point in time, two-thirds of the surface from a radius of 20 to 60 mm on the disk, is covered with stearic acid. This state is equivalent to the state seen in FIG. 9B. After maintaining this state for 2 minutes, the state in FIG. 9C is realized. This sample material was placed on a hot plate heated to 80° C. and left for 10 seconds, the sodium hydroxide solution was then evaporated and the state in FIG. 9D was attained. In the case in which the temperature of the hot plate is 80° C., the molecules of the stearic acid will remain on the sample material without evaporating.

Here, the sample material A, sputtered with Ag to a thickness of 20 nm and EnS—SiC$_2$ to a thickness of 30 nm on the polycarbonate substrate with a thickness of 1.2 mm, was brought near the surface, as seen in FIG. 9C, and the stearic acid moved to the surface of material sample A. The phase-change film is of the hydrophobic group, and the contact angle with the water was approximately 70°. The contact angle with the water of ZnS—SiO$_2$ on the other hand was approximately 30°. The EnS—SiC$_2$ is in a range intermediate between the hydrophobic group and hydrophilic group. The interfacial energy of the stearic acid, where the hydrophilic group is oriented towards the phase-change film, can be reduced as EnS—SiC$_2$ comes near by movement towards the ZnS—SiO$_2$ surface.

A phase-change film made Ge$_5$Sb$_{70}$Te$_{25}$ was sputtered onto this sample material. This sample material was then immersed in isopropyl alcohol for 10 seconds. In this way, stearic acid is way dissolved, and the phase-change film sputtered on the stearic acid is lifted off and removed. The phase-change film is strongly resistant to the isopropyl alcohol while in an amorphous state, and so the phase-change film formed in locations where there is no stearic acid still remains on the sample material. In this way, pits were formed from the phase-change material.

Figure 15:
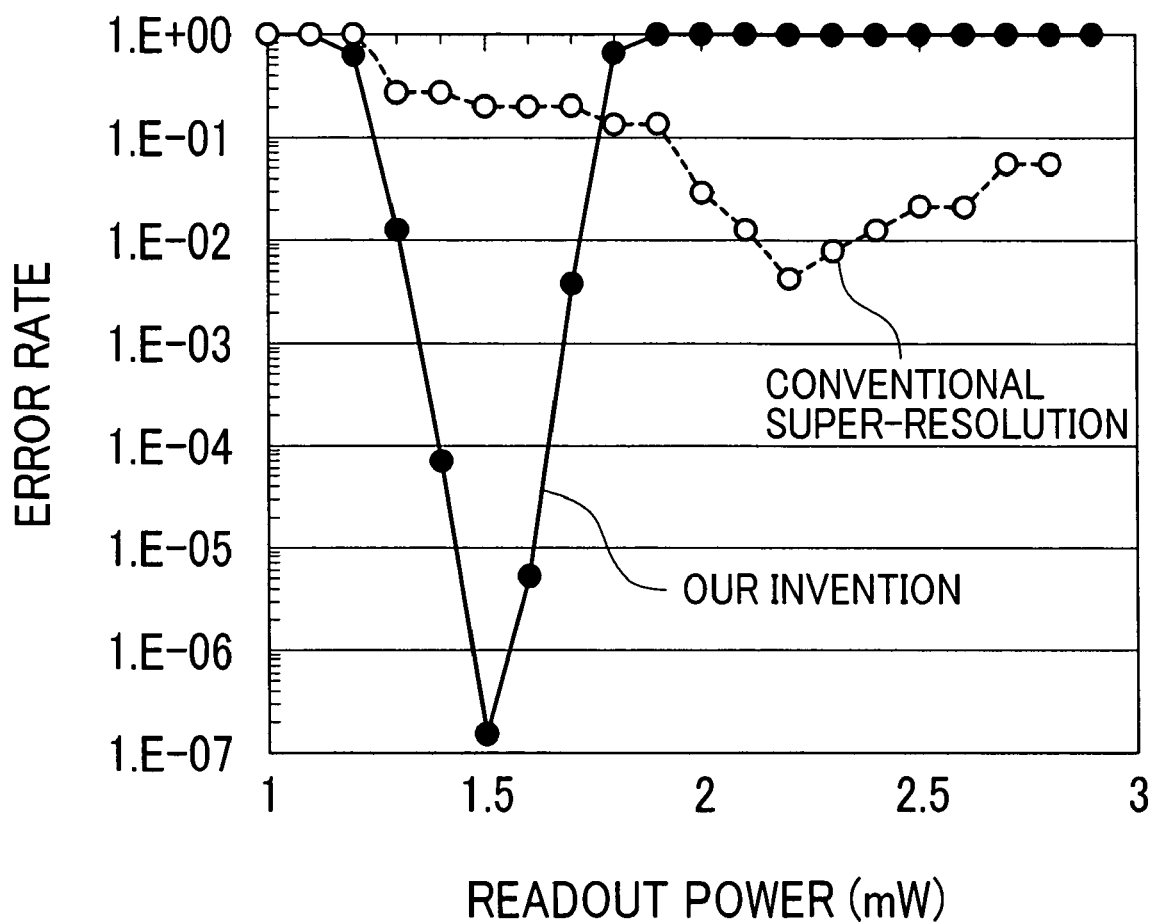
FIG. 15 is a graph showing the dependency of readout power on the error rate of the readout signal obtained in a third embodiment of the present invention.

Next, SiC$_2$ is sputtered to a thickness of 55 nm on this sample material, and bonded to a 0.1 mm thick polycarbonate sheet by a CV curable resin. The record data of this material was read out on the disk tester of FIG. 11. The data obtained is shown in FIG. 15. The error rate data for a conventional super-resolution disk is also shown for purposes of comparison. The data for this conventional super-resolution disk is the same as shown in FIG. 14. The data in FIG. 15 is qualitatively the same as that shown in FIG. 14. The best error rate was obtained at a readout power of 1.5 mW, which is the same as that in the second embodiment. However, that error rate was 1.5×10$^{-7}$, which was more satisfactory than the error rate of the second embodiment. The reason for the more favorable error rate is considered to be due to the fact that the disk fabrication method of the present embodiment has lower disk noise than the disk fabrication method of the second embodiment.

The currently used drive was modified and data was read out. Modifications of the drive covered two points. First of all, the drive was modified so that the readout power could be set to an optional value of 2 mW or less. Next, a mechanism was installed to select a readout power where the error rate is minimal during readout of a specified disk pattern. When data was readout on that drive, the optimal readout power was 1.5 mW, and the error rate at that time was 9.7×10$^4$.

Fourth Embodiment

Recording the data with an electron beam was attempted. Ag having a thickness of 100 nm and a phase-change material Ge$_2$Sb$_5$Te$_5$ having a thickness of 20 nm were sputtered onto a glass substrate. An electron beam was irradiated onto the focus point on the phase-change film surface of this sample material, and the data was written by crystallization. During recording, the sample material was rotated at a speed of 1 meter per second. The electron beam acceleration voltage was 10 kV and the current was 20 nA at this time. The electron beam turned on and off according to the mark pattern to be written. Three types of mark patterns with minimum lengths of 60 nm, 40 nm and 20 nm were recorded here.

After the electron beam formed the mark pattern, the disk was then fabricated by the same process as described in conjunction with the third embodiment. When this disk was read out in the drive as described in the third embodiment, the error rates were respectively, 3.4×10$^{-7}$ when the shortest mark length was 60 nm; 2.2×10$^{-5}$ when the shortest mark length was 40 nm; and 5.8×10$^{-3}$ when the shortest mark length was 20 nm. The reason why the error rates were lower than those of the first through the third embodiments is that the mark shape was circular and not a chevron shape.

Fifth Embodiment

In this method, an multi-layer disk was fabricated and the recorded data was read out. The disk fabrication method was approximately the same as that used in the third embodiment. After fabricating the single layer disk of the third embodiment, intermediate layers were formed with CV curable resin and without bonding to a polycarbonate sheet. The intermediate layers were all formed to a thickness of 3 μm. Etching was performed, and the phase-change pits, whose layers were already formed, were enclosed by material resistant to the alkaline solution and so remained on the layer without dissolving.

An eight-layer disk comprised of the film shown in FIG. 5 was then fabricated. The readout power and the error rate during readout of the respective layers on the disk are shown in FIG. 16. The reason for changing the readout power according to the layer is that the light is blocked by intervening layers so that the reflectivity and light power are attenuated when they reach the layer for readout, as previously described using Equation 2. The reflectivity here depends on the square of the product of the transmittance, as indicated in Equation 2, and the amount of light arriving at the layer for readout depends on the product of the transmittance. In accordance with the present invention, the amount of light arriving at the layer for readout is important for melting the pit; and the amount of reflectivity is important in terms of readout signal size. Therefore maintaining a balance between the transmittance and reflectivity is essential. However, the stress was placed on the reflectivity, and the square of the product of the transmittance was multiplied by a readout power of 1.5 mW. In other words, the effective power arriving at each layer was larger than 1.5 mW. However, a satisfactory error rate was obtained in the results shown in FIG. 16. This satisfactory error rate was due to the following three points. A first point is that the differential between the transmittance and the square of the transmittance was not very large, because each layer was given a high transmittance in the disk design. A second reason is that the differential between the transmittance and the square of the transmittance was within the readout power margin. A third reason is that, in the disk structure utilized here, the phase-change films in the sixth through the eighth layers are thick, and the readout power needed to melt the phase-change pits is large.

Therefore, an eight-layer disk was fabricated as described above. A single layer contains a recording capacity of 125 GB, so that one disk contains a total recording capacity of 1 TB. In other words, readout of an optical disk with a capacity of 1 TB was demonstrated by varying the readout power on a conventional disk drive.

What is claimed is:

1. An optical information recording medium that reproduces information by an irradiation of a beam spot having a predetermined size, comprising:

a substrate; and a recording film formed directly or via a protective film on the substrate, said recording film further comprising:

a plurality of recording pits in which a super resolution material is filled, wherein each said recording pit comprises a recording mark; and a thermal insulator to separate said plurality of recording pits from each other, said thermal insulator being comprised of a material with a heat conductivity lower than heat conductivity of the super resolution material, wherein an area of each of said recording pits is smaller than that of said beam spot, wherein said thermal insulator surrounds said recording pits to isolate the recording pits from one another, and wherein said plurality of recording pits and said thermal insulator are formed in a same layer of said recording film.

2. An information reproducing method comprising:

using an optical information recording medium including a recording layer that includes recording pits filled with a super resolution material and a heat blocking thermal insulator for separating said recording pits from each other, wherein the thermal insulator is comprised of a material with heat conductivity lower than the heat conductivity of the super resolution material;

irradiating the optical information recording medium with light having a spot size larger than an area of each of the recording pits;

melting a part of recording pits being included in an area irradiated by the light; and reading out information by detecting signals from the melted recording pits, wherein said thermal insulator surrounds said recording pits to isolate the recording pits from one another, and wherein said plurality of recording pits and said thermal insulator are formed in a same layer of said recording film.

3. An optical information recording medium according to claim 1, wherein the recording pits are contained in multiple layers.

4. An optical information recording medium according to claim 3, wherein a gap between the mutually adjacent multiple layers including recording pits is 500 nm or more and 1.4 micrometers or less.

5. An optical information recording medium according to claim 1, wherein the super resolution material includes antimony and tellurium.

6. An optical information recording medium according to claim 1, wherein the thermal insulator is comprised of a material containing $SiC_2$.

7. An optical information recording medium according to claim 1, wherein the recording pits are arranged as circular marks or chevron marks.

8. An information reproducing method according to claim 2 for setting the irradiation power of the light so that the maximum jitter is at or less than a smallest pit length of the recording pits.

9. An information reproducing method according to claim 2, wherein the optical information recording medium includes multiple layers containing recording pits, and irradiates light onto a first layer among multiple layers, and reads out information by melting the recording pits on the first layer.

10. An optical information recording medium according to claim 1, wherein length of said recording pits is modulated according to the information recorded to the medium.

11. An optical information recording medium according to claim 2, wherein said part of the recording pits are melted by using an intensity distribution in the beam spot of said light.

* * * * *